(12) United States Patent
Tsuzuki et al.

(10) Patent No.: US 10,627,307 B2
(45) Date of Patent: Apr. 21, 2020

(54) GAS MONITORING PROGRAM, SYSTEM, RECORDING MEDIUM, AND METHOD

(71) Applicant: Konica Minolta, Inc., Chiyoda-ku, Tokyo (JP)

(72) Inventors: Seiichi Tsuzuki, Takatsuki (JP); Kiyotaka Murakami, Hachioji (JP); Hisanori Kawashima, Hino (JP); Ryo Minegishi, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/092,017

(22) PCT Filed: Apr. 12, 2017

(86) PCT No.: PCT/JP2017/014904
§ 371 (c)(1),
(2) Date: Oct. 8, 2018

(87) PCT Pub. No.: WO2017/179599
PCT Pub. Date: Oct. 19, 2017

(65) Prior Publication Data
US 2019/0113414 A1   Apr. 18, 2019

(30) Foreign Application Priority Data
Apr. 14, 2016   (JP) .................................. 2016-081025

(51) Int. Cl.
*G01M 3/04*   (2006.01)
*G01N 21/3504*   (2014.01)
(Continued)

(52) U.S. Cl.
CPC .......... *G01M 3/04* (2013.01); *G01N 21/3504* (2013.01); *G08B 21/182* (2013.01); *H04N 5/33* (2013.01)

(58) Field of Classification Search
None
See application file for complete search history.

(56) References Cited

U.S. PATENT DOCUMENTS 5,430,293 A * 7/1995 Sato .................... G01M 3/38
250/330
2009/0303058 A1* 12/2009 Goodman ............ G01M 3/24
340/605

(Continued)

FOREIGN PATENT DOCUMENTS

JP   H05-46891   2/1993
JP   H07-93018   4/1995

OTHER PUBLICATIONS

International Search Report issued in parent PCT Application No. PCT/JP2017/014904, dated Jun. 13, 2017.

(Continued)

*Primary Examiner* — Kate H Luo
(74) *Attorney, Agent, or Firm* — BakerHostetler

(57) ABSTRACT

A non-transitory computer-readable storage medium storing a gas monitoring program causes a computer to acquire a continuous frame of an infrared image, to calculate a concentration-thickness product of leaking gas in the infrared image, to assume a gas leakage location of the leaking gas in the infrared image, to set a gas type which circulates in a pipe proximate to the gas leakage location as a gas type of the leaking gas by referring to circulating substance information of the piping equipment and matching the gas leakage location, to set a maintenance threshold value for the concentration-thickness product of the leaking gas, to estimate a leakage volume from the gas leakage location per unit of time of the gas type, and to predictively calculate a timing when the concentration-thickness product exceeds (Continued)

the maintenance threshold value on a basis of a time-changing leakage volume per unit of time.

7 Claims, 18 Drawing Sheets

(51) Int. Cl.
*G08B 21/18* (2006.01)
*H04N 5/33* (2006.01)

(56) References Cited

U.S. PATENT DOCUMENTS

2011/0018996 A1* 1/2011 Mian .................. G08B 13/1672
 348/143
2012/0198058 A1* 8/2012 Pogorelik .............. G06Q 10/04
 709/224
2013/0264476 A1* 10/2013 Damiano, Jr. .......... H01J 37/20
 250/307
2015/0308938 A1* 10/2015 Scheucher ......... G01N 33/0006
 73/1.06

OTHER PUBLICATIONS

International Preliminary Report on Patentability issued in parent PCT Application No. PCT/JP2017/014904, dated Oct. 16, 2018.

* cited by examiner

INFRARED IMAGE

INFRARED IMAGE

INFRARED IMAGE

FIG.19A1
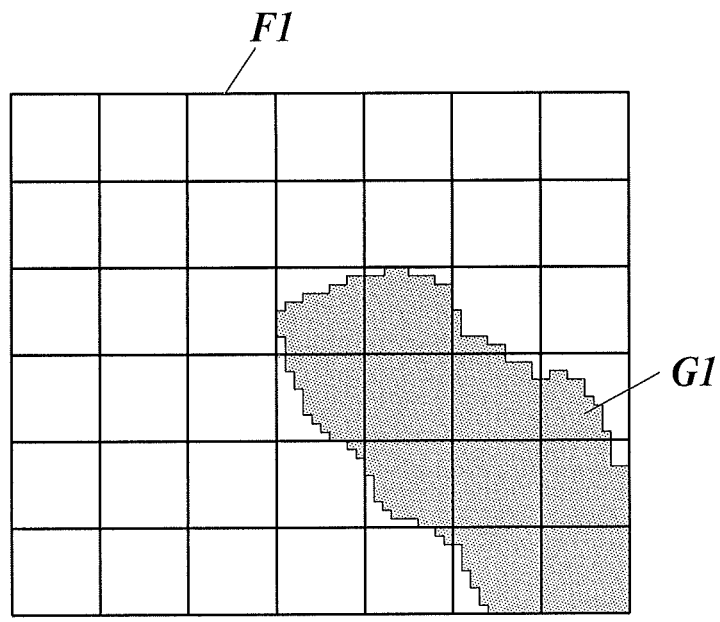
FIG.19B1
| | | | F1 | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 1 | 1 | 0 | 0 |
| 0 | 0 | 0 | 1 | 1 | 1 | 1 |
| 0 | 0 | 0 | 0 | 1 | 1 | 1 |
| 0 | 0 | 0 | 0 | 0 | 1 | 1 |

FIG.19A2
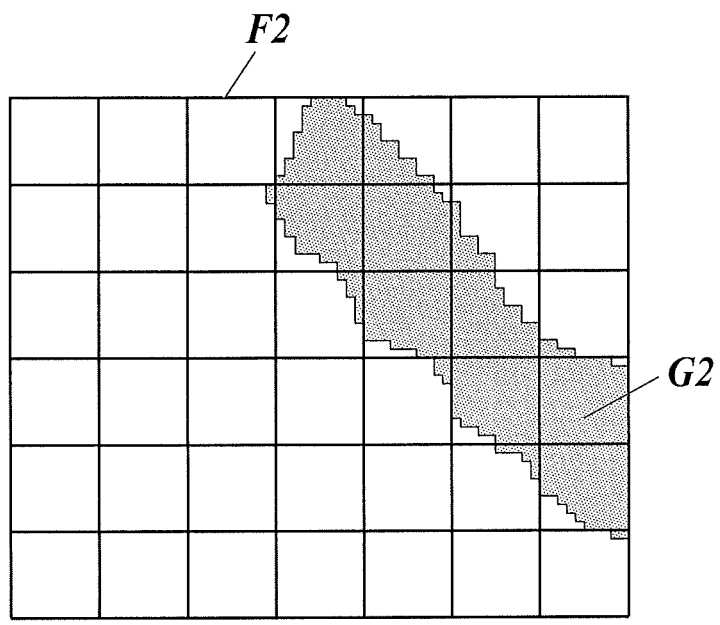
FIG.19B2
| F2 | | | | | | |
|---|---|---|---|---|---|---|
| 0 | 0 | 0 | 1 | 0 | 0 | 0 |
| 0 | 0 | 0 | 1 | 1 | 0 | 0 |
| 0 | 0 | 0 | 0 | 1 | 1 | 0 |
| 0 | 0 | 0 | 0 | 0 | 1 | 1 |
| 0 | 0 | 0 | 0 | 0 | 0 | 1 |
| 0 | 0 | 0 | 0 | 0 | 0 | 0 |

FIG.19A3
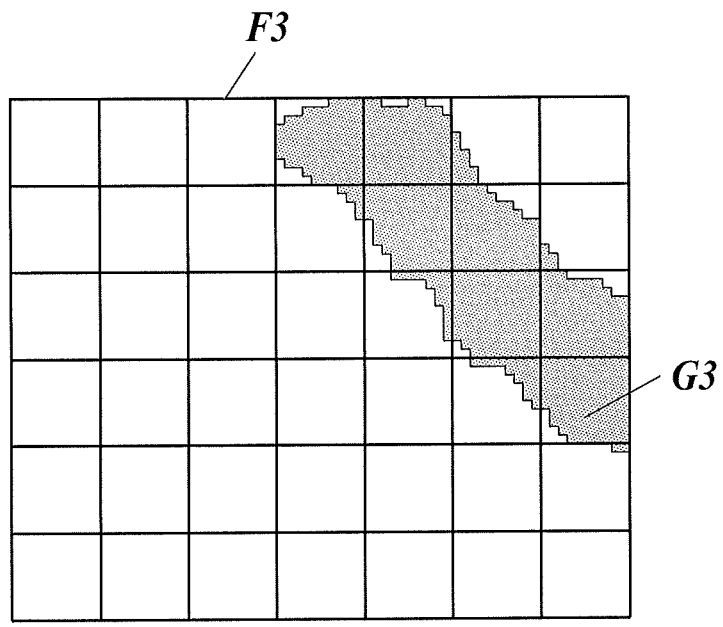
FIG.19B3
| 0 | 0 | 0 | 1 | 1 | 0 | 0 |
|---|---|---|---|---|---|---|
| 0 | 0 | 0 | 0 | 1 | 1 | 0 |
| 0 | 0 | 0 | 0 | 0 | 1 | 1 |
| 0 | 0 | 0 | 0 | 0 | 0 | 1 |
| 0 | 0 | 0 | 0 | 0 | 0 | 0 |
| 0 | 0 | 0 | 0 | 0 | 0 | 0 |

| 0 | 0 | 0 | 2 | 1 | 0 | 0 |
|---|---|---|---|---|---|---|
| 0 | 0 | 0 | 1 | 2 | 1 | 0 |
| 0 | 0 | 0 | 1 | 2 | 2 | 1 |
| 0 | 0 | 0 | 1 | 1 | 2 | 3 — B47 |
| 0 | 0 | 0 | 0 | 1 | 1 | 2 |
| 0 | 0 | 0 | 0 | 0 | 1 | 1 |

GAS MONITORING PROGRAM, SYSTEM, RECORDING MEDIUM, AND METHOD

CROSS-REFERENCE TO RELATED APPLICATIONS

The present U.S. Patent Application is a U.S. National Phase Application under 35 U.S.C. 371 of International Application PCT/JP2017/014904 filed on Apr. 12, 2017. This application claims a priority under the Paris Convention of Japanese Patent Application No. 2016-081025 filed on Apr. 14, 2016, the entire disclosure of which is incorporated herein by reference in its entirety.

TECHNOLOGICAL FIELD

The present invention relates to gas monitoring based on infrared images useful for predictive maintenance.

BACKGROUND ART

It is structurally impossible to avoid gas leaks from flange parts or valve parts of piping in a plant. In a large plant, which requires long running time, the production is continued with follow-up observations while gas is leaking, as long as effects on the environment are small and do not cause problems, and the maintenance such as part replacements is carried out while the production is suspended in the regular or irregular repairs.

This is based on the idea of ALARP (As Low As Reasonably Practicable), to eliminate accidents reasonably while suppressing excessive facility investments, which is referred to in the "Guidelines for Investigation of Danger or Toxicity, etc. (commonly known as "risk assessment guidelines") and Instructions thereof," p. 24, by Safety Division, Industrial Safety and Health Department, Ministry of Health, Labour, and Welfare, March 2006.

However, it has been necessary for the operators to make rounds for follow-up observations, and there has been no means to manage the state of leakage quantitatively, continuously and collectively. The repairs and the following planning for production and marketing based on the unreliable information are not reasonable enough, requiring the excessive safety margin.

In the patent document 1, described is a system to make a diagnosis for predictive maintenance by analysis of the physical parameters with values indicating the operational state of machine.

In the patent document 2, described is a system to make a diagnosis for predictive maintenance with reference to the parameters indicating the operational state and, if needed, communicate with the remote administrative computer so that the administrator diagnoses in detail.

PRIOR ART DOCUMENTS

Patent Documents

Patent Document 1: JP H07-93018A
Patent Document 2: JP H05-46891A

SUMMARY OF THE INVENTION

Problems to be Solved by the Invention

However, in the systems described in the patent documents 1 and 2, the operation of machine itself is referred to as the parameters for predictive maintenance, and the leakage (error) itself that is actually occurring is not monitored as the parameters.

The present invention has been conceived in view of the above problems in the conventional techniques, and an object of the present invention is predicting the maintenance timing of the piping equipment by continuously monitoring gas leaking from the piping equipment.

Means for Solving the Problems

To achieve at least one of the aforementioned objects, according to an aspect of the present invention, a gas monitoring program causes a computer to execute:

an image acquisition step to consecutively acquire a continuous frame of an infrared image in which an area including piping equipment to be a monitoring object is taken;

a concentration-thickness product calculation step to calculate a concentration-thickness product of leaking gas in the infrared image on the basis of the infrared image acquired at the image acquisition step;

a gas leakage location assumption step to assume a gas leakage location of the leaking gas in the infrared image on the basis of the infrared image acquired at the image acquisition step and including time-series multiple frames;

a gas type setting step to set a gas type which circulates in a pipe proximate to the gas leakage location as a gas type of the leaking gas from the gas leakage location by referring to circulating substance information of the piping equipment and matching the gas leakage location assumed at the gas leakage location assumption step;

a maintenance threshold value setting step to set a maintenance threshold value for the concentration-thickness product of the leaking gas of the gas type set at the gas type setting step;

a leakage volume estimation step to estimate a leakage volume from the gas leakage location assumed at the gas leakage location assumption step per unit of time of the gas type set at the gas type setting step on the basis of the infrared image acquired at the image acquisition step and including the time-series multiple frames; and a maintenance timing predictive calculation step to predictively calculate a timing when the concentration-thickness product calculated at the concentration-thickness product calculation step exceeds the maintenance threshold value on a basis of a time-changing leakage volume per unit of time estimated at the leakage volume estimation step.

In another aspect of the present invention the gas monitoring program further causes the computer to execute:

a maintenance threshold value determination step to determine whether the concentration-thickness product calculated at the concentration-thickness calculation step exceeds the maintenance threshold value; and a notification step to notify that the concentration-thickness product exceeds the maintenance threshold value when it is determined that the concentration-thickness product exceeds the maintenance threshold value at the maintenance threshold value determination step.

In another aspect of the present invention the gas monitoring program further causes the computer to execute: a gas type correction step to correct the gas type set at the gas type setting step on a basis of an input signal.

In order to achieve at least one of the aforementioned objects, the invention is the gas monitoring system includes a computer which can execute:

an image acquisition step to consecutively acquire a continuous frame of an infrared image in which an area including piping equipment to be a monitoring object is taken;

a concentration-thickness product calculation step to calculate a concentration-thickness product of leaking gas in the infrared image on the basis of the infrared image acquired at the image acquisition step;

a gas leakage location assumption step to assume a gas leakage location of the leaking gas in the infrared image on the basis of the infrared image acquired at the image acquisition step and including time-series multiple frames;

a gas type setting step to set a gas type which circulates in a pipe proximate to the gas leakage location as a gas type of the leaking gas from the gas leakage location by referring to circulating gas type information of the piping equipment and matching the gas leakage location assumed at the gas leakage location assumption step;

a maintenance threshold value setting step to set a maintenance threshold value for the concentration-thickness product of the leaking gas of the gas type set at the gas type setting step;

a leakage volume estimation step to estimate a leakage volume from the gas leakage location assumed at the gas leakage location assumption step per unit of time of the gas type set at the gas type setting step; and a maintenance timing predictive calculation step to predictively calculate a timing when the concentration-thickness product calculated at the concentration-thickness product calculation step exceeds the maintenance threshold value on a basis of a time-changing leakage volume per unit of time estimated at the leakage volume estimation step.

The gas monitoring may further cause the computer to execute:

a maintenance threshold value determination step to determine whether the concentration-thickness product calculated at the concentration-thickness calculation step exceeds the maintenance threshold value; and a notification step to notify that the concentration-thickness product exceeds the maintenance threshold value when it is determined that the concentration-thickness product exceeds the maintenance threshold value at the maintenance threshold value determination step.

The invention according to yet another aspect, further includes a computer which can execute a gas type correction step to correct the gas type set at the gas type setting step on a basis of an input signal.

In order to achieve at least one of the aforementioned objects, the invention is a computer readable recording medium storing a gas monitoring program which causes a computer to execute:

an image acquisition step to consecutively acquire a continuous frame of an infrared image in which an area including piping equipment to be a monitoring object is taken;

a concentration-thickness product calculation step to calculate a concentration-thickness product of leaking gas in the infrared image on the basis of the infrared image acquired at the image acquisition step;

a gas leakage location assumption step to assume a gas leakage location of the leaking gas in the infrared image on the basis of the infrared image acquired at the image acquisition step and including time-series multiple frames;

a gas type setting step to set a gas type which circulates in a pipe proximate to the gas leakage location as a gas type of the leaking gas from the gas leakage location by referring to circulating substance information of the piping equipment and matching the gas leakage location assumed at the gas leakage location assumption step;

a maintenance threshold value setting step to set a maintenance threshold value for the concentration-thickness product of the leaking gas of the gas type set at the gas type setting step;

a leakage volume estimation step to estimate a leakage volume from the gas leakage location assumed at the gas leakage location assumption step per unit of time of the gas type set at the gas type setting step on the basis of the infrared image acquired at the image acquisition step and including the time-series multiple frames; and a maintenance timing predictive calculation step to predictively calculate a timing when the concentration-thickness product calculated at the concentration-thickness product calculation step exceeds the maintenance threshold value on a basis of a time-changing leakage volume per unit of time estimated at the leakage volume estimation step.

In order to achieve at least one of the aforementioned objects, the invention is a gas monitoring method using a computer to execute:

an image acquisition step to consecutively acquire a continuous frame of an infrared image in which an area including piping equipment to be a monitoring object is taken;

a concentration-thickness product calculation step to calculate a concentration-thickness product of leaking gas in the infrared image on the basis of the infrared image acquired at the image acquisition step;

a gas leakage location assumption step to assume a gas leakage location of the leaking gas in the infrared image on the basis of the infrared image acquired at the image acquisition step and including time-series multiple frames;

a gas type setting step to set a gas type which circulates in a pipe proximate to the gas leakage location as a gas type of the leaking gas from the gas leakage location by referring to circulating substance information of the piping equipment and matching the gas leakage location assumed at the gas leakage location assumption step;

a maintenance threshold value setting step to set a maintenance threshold value for the concentration-thickness product of the leaking gas of the gas type set at the gas type setting step;

a leakage volume estimation step to estimate a leakage volume from the gas leakage location assumed at the gas leakage location assumption step per unit of time of the gas type set at the gas type setting step on the basis of the infrared image acquired at the image acquisition step and including the time-series multiple frames; and a maintenance timing predictive calculation step to predictively calculate a timing when the concentration-thickness product calculated at the concentration-thickness product calculation step exceeds the maintenance threshold value on a basis of a time-changing leakage volume per unit of time estimated at the leakage volume estimation step.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 19A1 shows a schematic drawing of the first image frame where a gas region is detected concerning the function of assuming the gas leakage location in accordance with the present embodiment.

FIG. 19B1 shows a drawing of the determination results of a gas region in the image frame in the FIG. 19A1.

FIG. 19A2 shows a schematic drawing of the second image frame where a gas region is detected concerning the function of assuming the gas leakage location in accordance with the present embodiment.

FIG. 19B2 shows a drawing of the determination results of a gas region in the image frame in the FIG. 19A2.

FIG. 19A3 shows a schematic drawing of the third image frame where a gas region is detected concerning the function of assuming the gas leakage location in accordance with the present embodiment.

FIG. 19B3 shows a drawing of the determination results of a gas region in the image frame in the FIG. 19A3.

DETAILED DESCRIPTION OF EMBODIMENTS

Hereinafter, one or more embodiments of the present invention will be described with reference to the drawings. However, the scope of the invention is not limited to the disclosed embodiments.

Effects of the Invention

The present invention has an effect of predicting the maintenance timing of the piping equipment by continuously monitoring gas leaking from the piping equipment.

[Outline of the Gas Monitoring System (Program, Method)]

Figure 1:
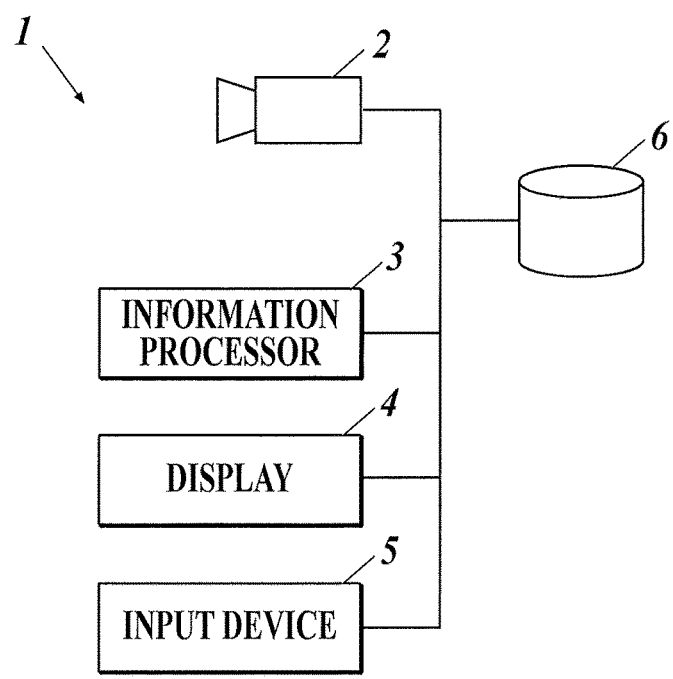
FIG. 1 shows a block diagram of the gas monitoring system in accordance with the present embodiment.

As shown in FIG. 1, a gas monitoring system 1 which executes the gas monitoring method in the present embodiment is configured to incorporate an infrared camera 2, an information processor 3, a display 4, an input device 5, and an information memory 6.

The information processor 3 includes a computing part of a computer which executes various computations according to the gas monitoring program stored in a computer-readable recording medium on the basis of the infrared images taken by the infrared camera 2 or the input signals from the input device 5.

The information processor 3 stores the infrared images taken by the infrared camera 2 and the computation results of the information processor 3.

The display 4 displays the images and sound, and the input device 5 inputs the operational signals to the information processor 3.

The configuration of the hardware can take any form. The information processor 3, the display 4, the input device 5, and the information memory 6 may be configured in one computer, or shared in a server and one or more client computers. Preferably, an information sharing system is to be configured with the information processor 3 in a main computer to execute computations described later, the information memory 6 in a server, and the display 4 and the input device 5 in a main computer and other computers for viewing. In that case, the modification of settings is limitedly made by the input from the main computer and other authorized computers (users) in the operation.

Figure 2:
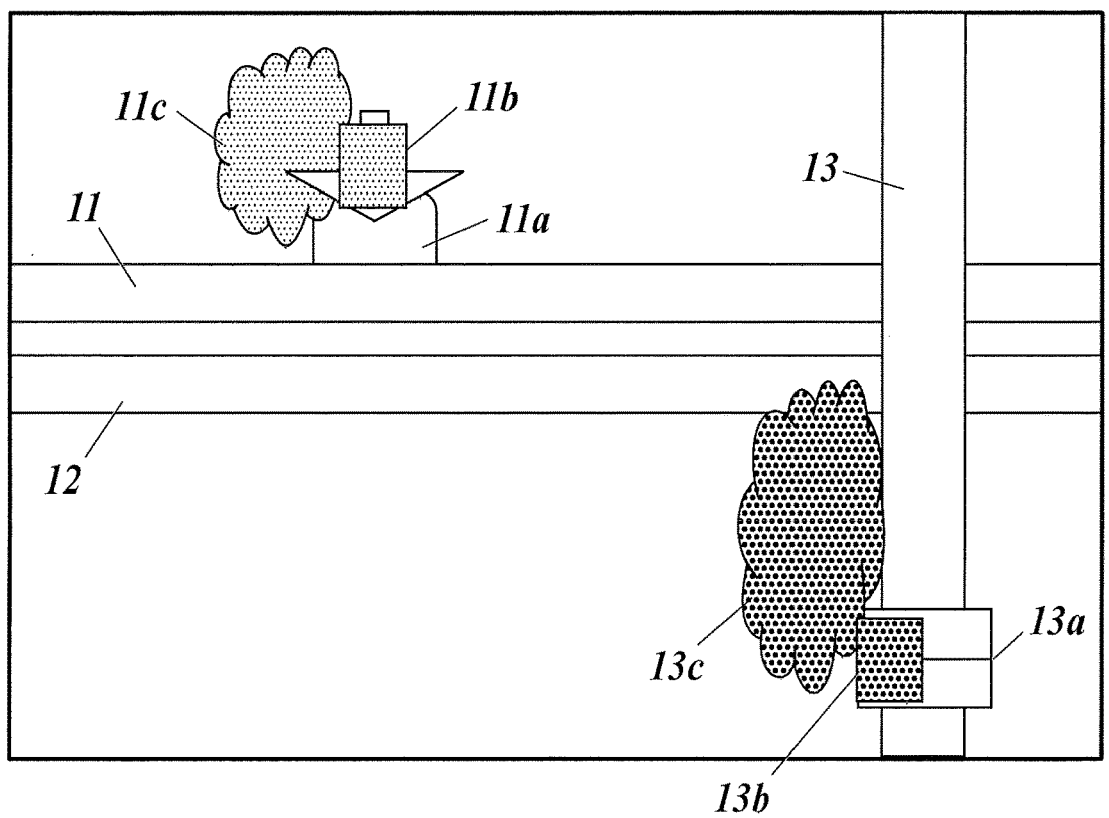
FIG. 2 shows a schematic drawing of an exemplary visualized infrared image taken by the gas monitoring system in accordance with the present embodiment.

Now assume that the infrared camera 2 is capturing an area including the piping equipment to be a monitoring object shown in FIG. 2. In FIG. 2, pipes 11, 12 and 13, a valve 11a disposed on the pipe 11, and a connector 13a disposed on the pipe 13 are captured.

Figure 3:
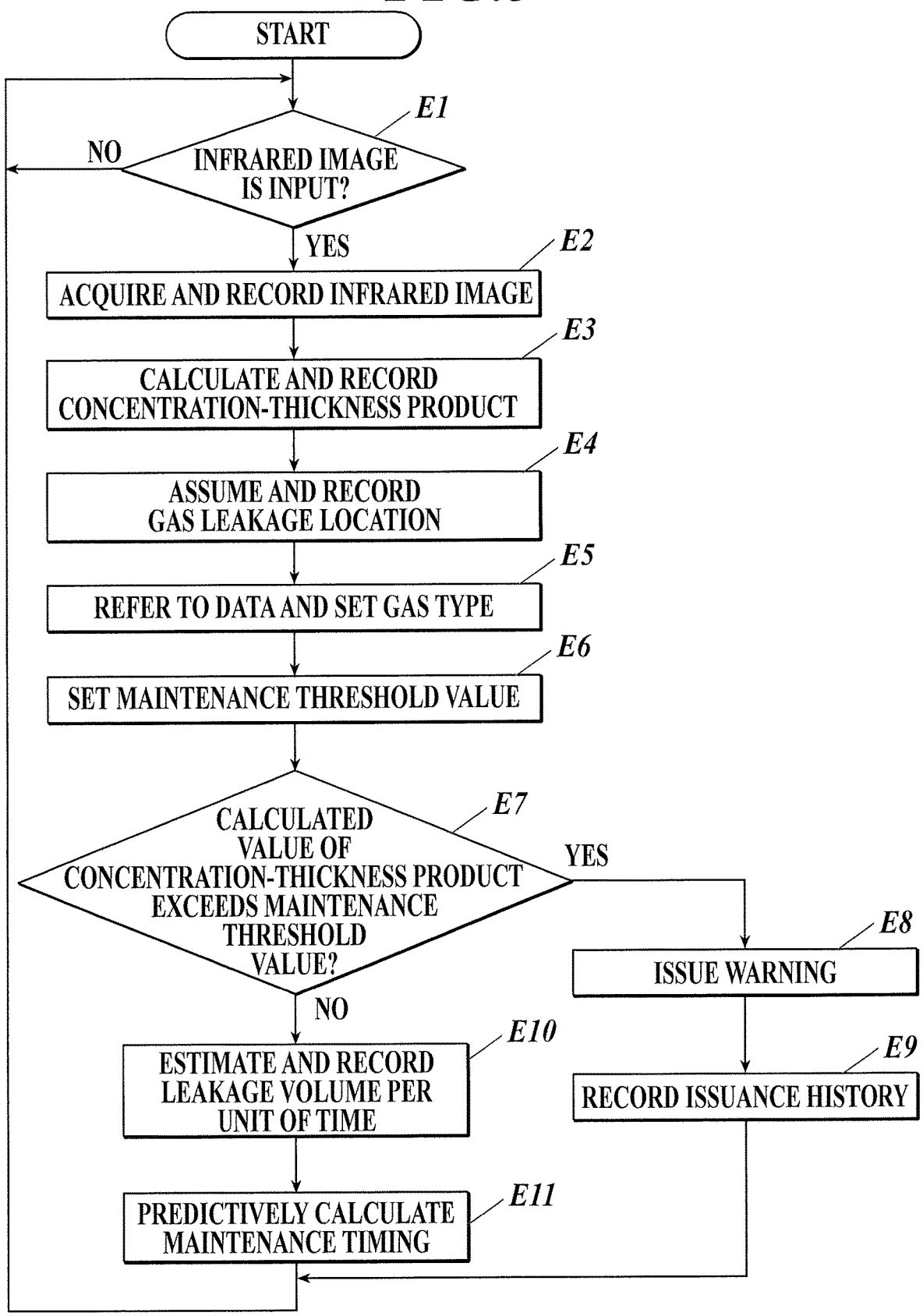
FIG. 3 shows a flowchart of the processing executed by the gas monitoring system in accordance with the present embodiment.

The explanation is given according to the flowchart shown in FIG. 3.

First, the information processor 3 executes an image acquisition step to consecutively acquire continuous frames of infrared images (if "YES" at Step E1, then Step E2). All the infrared images are to be recorded in the information memory 6 (Step E2).

Next, the information processor 3 executes a concentration-thickness product calculation step (E3) to calculate the concentration-thickness product of leaking gas in the infrared images on the basis of the infrared images acquired in the image acquisition step (E2). The calculated concentration-thickness product is recorded in the information memory 6 (E3).

Next, the information processor 3 executes a gas leakage location assumption step (E4) to assume a gas leakage location of the leaking gas in the infrared images on the basis of the time-series multiple frames of infrared images acquired in the image acquisition step (E2). This step is skipped before as many frames as required for assuming the gas leakage location have been acquired. The gas leakage location assumed in this step is recorded in the information memory 6 (E4). For example, the gas leakage location 11*b* is assumed as the leakage source of the leaking gas 11*c* shown in FIG. 2, and the gas leakage location 13*b* as the leakage source of the leaking gas 13*c*.

Next, the information processor 3 executes a gas type setting step (E5) to match the gas leakage locations 11*b* and 13*b* assumed at the gas leakage location assumption step (E4) with the circulating substance information of the piping equipment stored in the information memory 6 and referred to, and to set the type of gas circulating in the pipe proximate to the gas leakage location to the gas type of the leaking gas from the gas leakage locations 11*b* and 13*b*. For example, the gas type of the leaking gas from the gas leakage location 11*b* shown in FIG. 2 is set to water vapor, as the circulating substance information of the pipe 11 indicates water. Accordingly, the leaking gas 11*c* is set to water vapor. The gas type of the leaking gas from the gas leakage location 13*b* shown in FIG. 2 is set to methane, as the circulating substance information of the pipe 13 indicates methane. Accordingly, the leaking gas 13*c* is set to methane.

Figure 4:
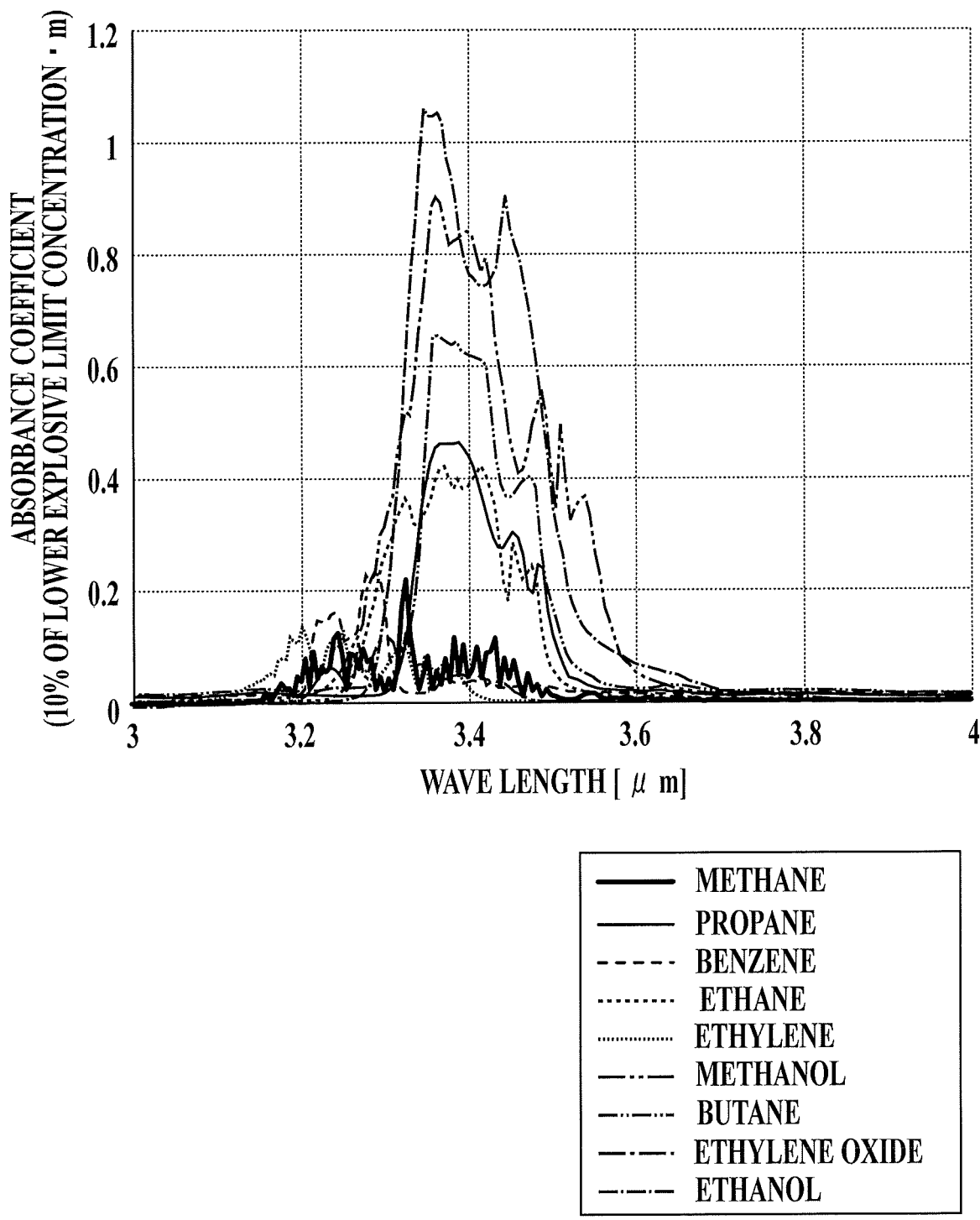
FIG. 4 shows graphs indicating the distribution of wave length of absorbance coefficient for each gas type with the vertical axis representing the absorbance coefficient where the thickness is 1 meter and the concentration is 10% of the lower explosive limit concentration.

Next, the information processor 3 executes a maintenance threshold value setting step (E6) to set a maintenance threshold value concerning the concentration-thickness product of the leaking gas of the gas type set at the gas type setting step (E5). The maintenance threshold value is set on the basis of the absorbance coefficient for each gas type shown in FIG. 4. The vertical axis in the graph of FIG. 4 represents the absorbance coefficient for each gas type where its thickness is 1 meter and its concentration is 10% of the lower explosive limit concentration. Such information on the absorbance coefficient for each gas type is stored in the information memory 6, and is referred to by the information processor 3 for setting the maintenance threshold value for the gas type set at the gas type setting step (E5). As the gas type of the leaking gas from the gas leakage location 13*b* shown in FIG. 2 is set to methane, the maintenance threshold value is set with reference to the information on methane. The gas monitoring system including the function of setting the gas type of the leaking gas to be monitored as described can reflect the environment of use to accurately comprehend the risk of the plant, the measure of assessment. If a signal to correct the gas type is input from the input device 5, the information processor 3 executes a gas type modification step to modify the gas type set at the gas type setting step (E5) on the basis of the input signal. The maintenance threshold value is also corrected according to the modification, so that, if a monitor staff or such discovers an error, the error can be modified.

Next, the information processor 3 executes a maintenance threshold value determination step (E7) to determine whether the concentration-thickness product calculated at the concentration-thickness product calculation step (E3) exceeds the maintenance threshold value, and a notification step, a warning issuance step (E8), to notify that the concentration-thickness product exceeds the maintenance threshold value if it is determined that the concentration-thickness product exceeds the maintenance threshold value at the maintenance threshold value determination step (E7). The information processor 3 executes an issuance history storing step (E9) to record the issuance history in the information memory 6 if the warning issuance step (E8) is executed. The issuance history includes the issuance date and time, the set gas type, the location information of issuance target (assumed gas leakage location) and such.

If a warning is issued at the warning issuance step (E8), the maintenance operation must be carried out immediately.

However, it is convenient to have information on the assumption of when a warning is likely to be issued for planning the maintenance operation. Thus the steps below are executed.

The information processor 3 executes a leakage volume estimation step (E10) to estimate the leakage volume per unit of time of the gas type set at the gas type setting step (E5) from the gas leakage location assumed at the gas leakage location assumption step (E4) on the basis of the time-series multiple frames of the infrared image acquired at the image acquisition step (E2). This step is skipped before as many frames as required for estimating the leakage volume have been acquired. The information processor 3 records the estimated leakage volume per unit of time in the information memory 6 (E10). For example, as shown by the solid line in the graph of FIG. 5, each time the latest estimated value is updated with more frames being input, the value is recorded and, accordingly, its transition is recorded.

Next, the information processor 3 executes a maintenance timing predictive calculation step (E11) to predictively calculate the timing when the concentration-thickness product calculated at the concentration-thickness calculation step (E3) exceeds the maintenance threshold value set at the maintenance threshold value setting step (E6) on the basis of the time-changing leakage volume per unit of time estimated at the leakage volume estimation step (E10).

Figure 5:
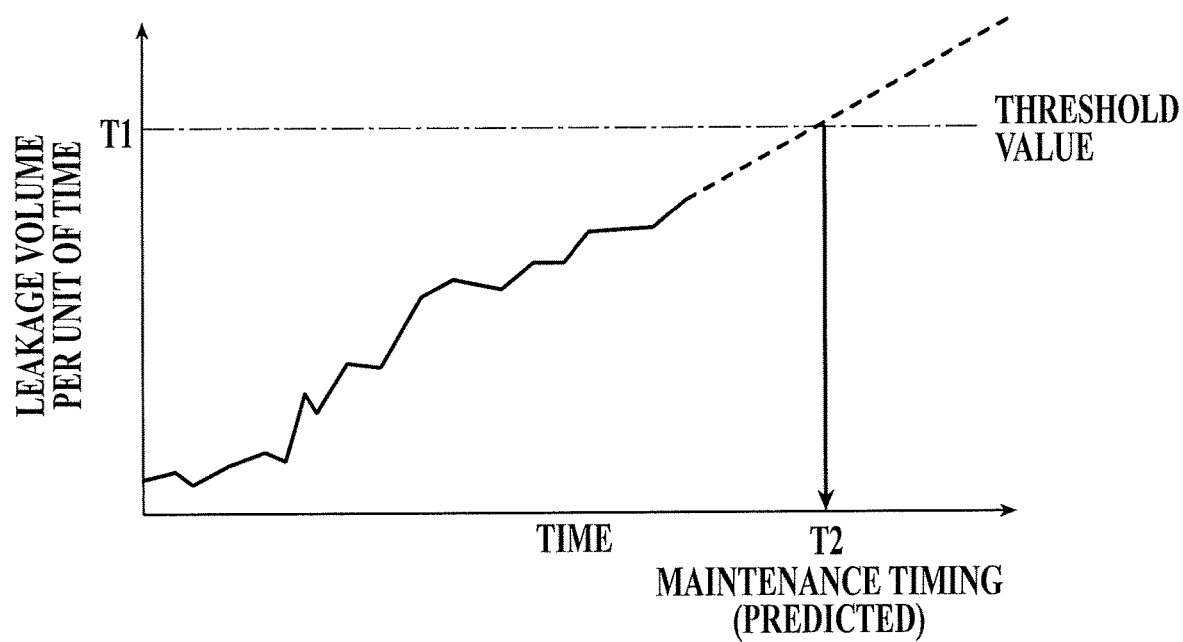
FIG. 5 shows a graph indicating the time-changing leakage volume per unit of time calculated by the gas monitoring system in accordance with one embodiment of the present invention, with the solid line concerning the leakage already occurred and the dashed line concerning the predicted leakage.

The predictive calculation of the maintenance timing is, as shown in FIG. 5, made by predicting the timing T2 when the threshold value T1 is to be attained as the maintenance timing, through the modeling of the tendency of increase from the transition already recorded (solid line) and the extrapolation of the predicted transition (dashed line). The threshold value T1 is set according to the definition that the concentration-thickness product calculated at the concentration-thickness product calculation step (E3) exceeds the maintenance threshold value set at the maintenance threshold value setting step (E6) when the leakage volume per unit of time corresponds to the threshold value T1.

As described above, the maintenance timing of the piping equipment may be predicted by continuous monitoring of gas leaking from the piping equipment.

Accordingly, the predicted maintenance timing for each part of the piping equipment is output, allowing the administrator who views it to project an effective maintenance plan. However, the planning is extremely difficult for large-scale equipment.

Therefore the information processor 3 projects and outputs a maintenance operation plan by referring to the equipment information, the maintenance capacity information (maintenance operation staff, maintenance operation machinery and tools, etc.), the production (marketing) record data, the demand record and prediction data, and such stored in the information memory 6.

The maintenance operation plan is projected under the condition that each maintenance target part is maintained before the predicted maintenance timing, taking priority on matching the demand, as well as considering an efficient execution of the maintenance operation.

The information processor 3 also projects and outputs the production plan and marketing plan according to the projected maintenance operation plan.

[Method for Calculating the Concentration-Thickness Product and Method for Calculating the Distribution of Gas Concentration in the Depth Direction]

Here the method for calculating the concentration-thickness product to execute the above-mentioned concentration-thickness product calculation step (E3), and the method for calculating the distribution of gas concentration in the depth direction as the technological basics to execute the above-mentioned leakage volume estimation step (E10).

Figure 6:
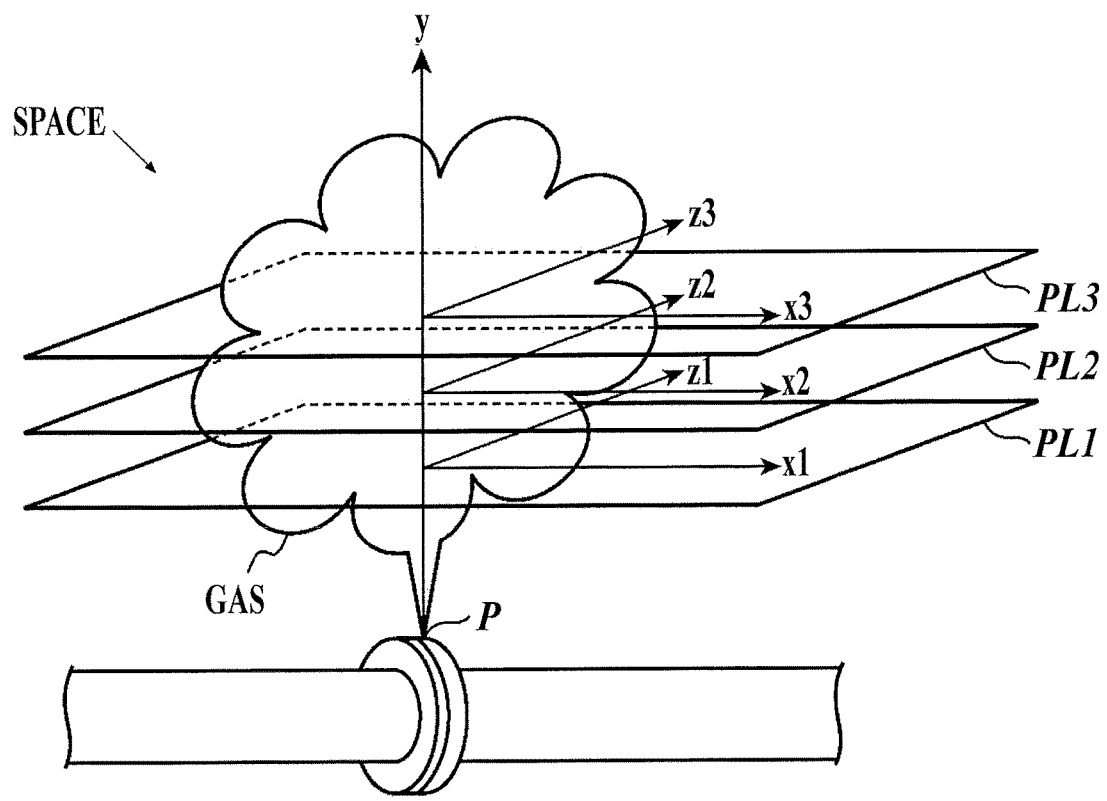
FIG. 6 shows an explanatory drawing of the relation between the gas floating in the space and the coordinate system virtually given in the space.

FIG. 6 is an explanatory drawing of the relation of the gas floating in the space and the coordinate system virtually given in the space. The monitoring object of gas leakage (ex. a connecting point of gas transporting pipes) is in the space. A gas leakage point P emerges at the point and gas leaking from the gas leakage point P is floating in the space.

The axis representing the direction up the gas leakage point P (the vertical direction) is the axis y. The axes x1, x2, and x3 are each perpendicular to the axis y and represent the horizontal direction. The axis z1 is perpendicular to the axes x1 and y, and represents the depth direction in the coordinate system of the axes x1, y, and z1. The axis z2 is perpendicular to the axes x2 and y, and represents the depth direction in the coordinate system of the axes x2, y, and z2. The axis z3 is perpendicular to the axes x3 and y, and represents the depth direction in the coordinate system of the axes x3, y, and z3. The plane PL1 is fixed by the axes x1 and z1. The plane PL2 is fixed by the axes x2 and z2. The plane PL3 is fixed by the axes x3 and z3.

In the space, the axis representing the direction directly above the gas leakage point P is the second axis (axis y). The axes representing the horizontal direction and perpendicular to the second axis are the first axes (axes x1, x2, and x3). The axes representing the depth direction and perpendicular to the second and first axes are the third axes (axes z1, z2, and z3). The first axes correspond to the horizontal axis set on the infrared image (FIG. 14), as described later. As the leaking gas spreads equally in the horizontal direction and in the depth direction in the space, the distribution of gas concentration along the first axis representing the horizontal direction in the space and the distribution of gas concentration along the third axis representing the depth direction in the space can be regarded equal.

Figure 7:
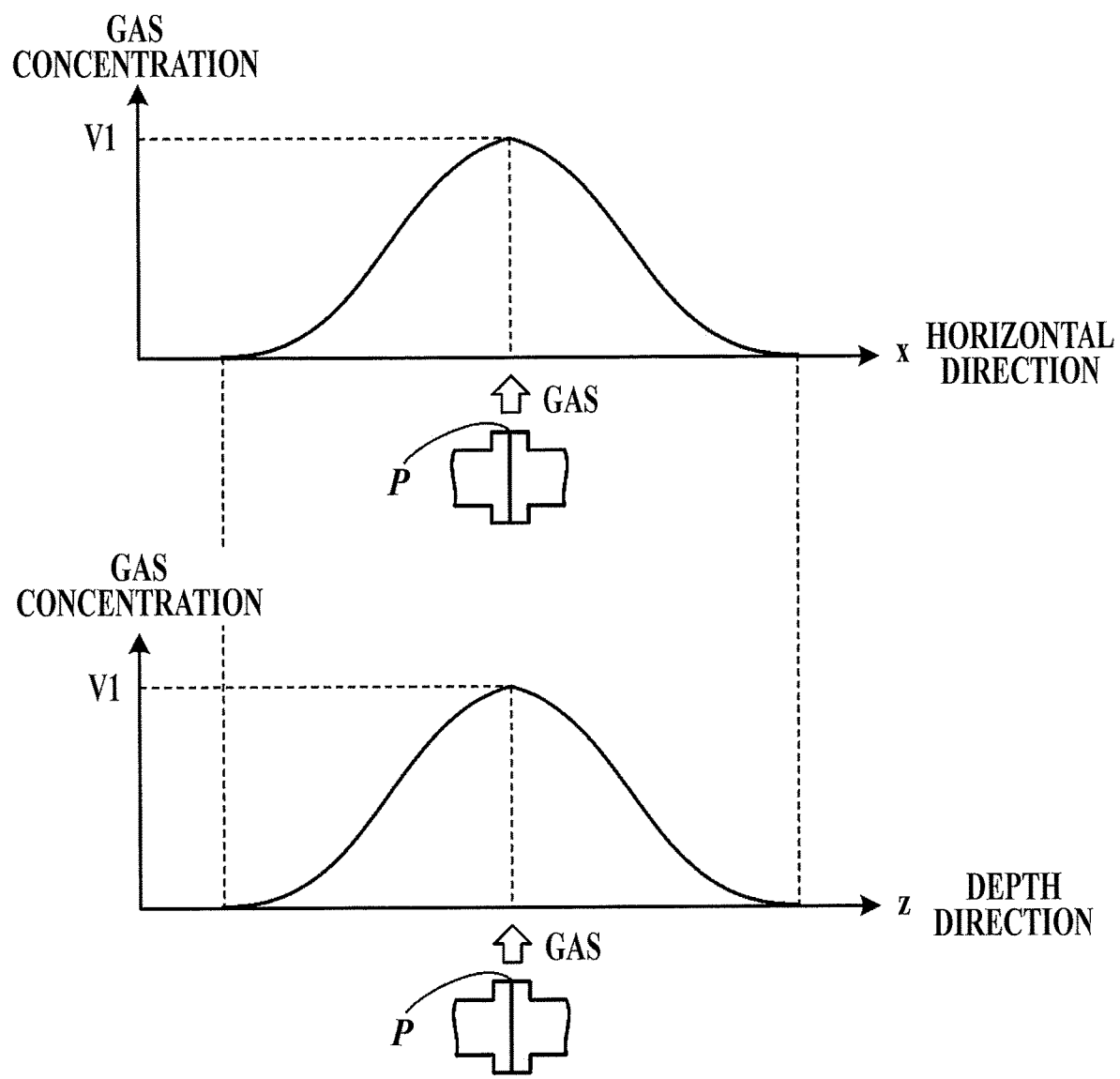
FIG. 7 shows graphs indicating the distribution of gas concentration in the horizontal direction and in the depth direction in the space.

Explanation about this is given with reference to the drawings. FIG. 7 is a graph showing the distribution of gas concentration in the horizontal direction and in the depth direction in the space. When the horizontal direction is represented by the axis x1, the depth direction is represented by z1, in FIGS. 6 and 7. When the horizontal direction is represented by the axis x2, the depth direction is represented by the axis z2. When the horizontal direction is represented by the axis x3, the depth direction is represented by the axis z3. The gas concentration decreases as distance from the gas leakage point P increases. Comparing the maximum value V1 of the gas concentration along the axes x1 and z1, that along the axes x2 and z2, and that along the axes x3 and z3, the maximum value V1 of the axes x1 and z1>the maximum value of the axes x2 and z2>the maximum value V1 of the axes x3 and z3.

In the present embodiment, the shape of graph indicating the distribution of gas concentration along the axis x and the shape of graph indicating the distribution of gas concentration along the axis z can be regarded as graph shape of normal distribution. In the same coordinate system, the distributions of gas concentration along the axes x and z are equal as a premise. Here the distribution of gas concentration along the axis x is expressed by the formula (1), and the distribution of gas concentration along the axis z is expressed by the formula (2).

[Math. 1]

$$c = \frac{1}{\sqrt{2\pi}\,\sigma} \exp\left(\frac{-x^2}{2\sigma^2}\right) \tag{1}$$

$$c = \frac{1}{\sqrt{2\pi}\,\sigma} \exp\left(\frac{-z^2}{2\sigma^2}\right) \tag{2}$$

$$\sigma = y^a,\ a > 0$$

The concentration distribution of gas is denoted by c. The standard deviation, that is, the spread of gas is denoted by σ. The distance from the gas leakage point P is denoted by y. The index is denoted by a. As the distance from the gas leakage point P increases, the gas spreads and the concentration decreases.

For example, the distribution of gas concentration along the axis x1 and the distribution of gas concentration along the axis z1 are equal, the distribution of gas concentration along the axis x2 and the distribution of gas concentration along the axis z2 are equal, and the distribution of gas concentration along the axis x3 and the distribution of gas concentration along the axis z3 are equal.

Figure 8:
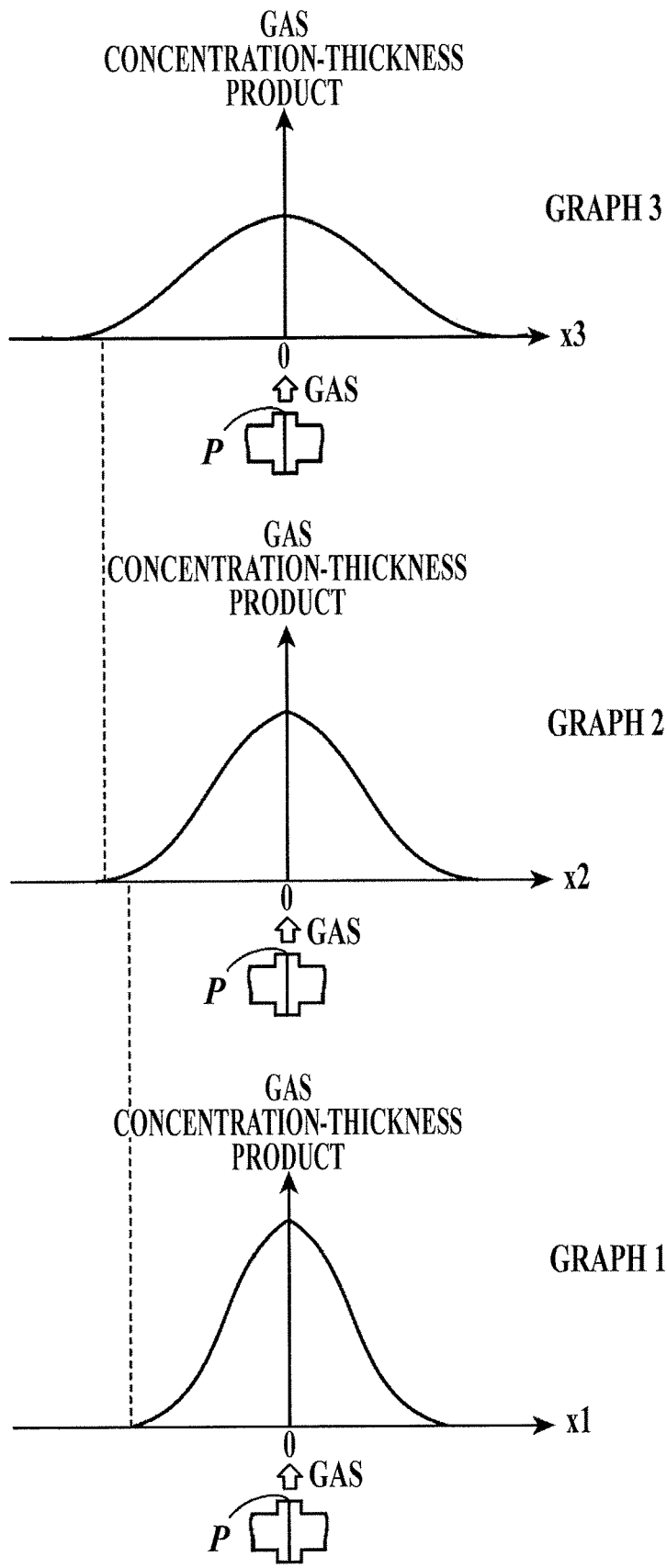
FIG. 8 shows graphs indicating the distribution of gas concentration-thickness product.

FIG. 8 is a graph indicating the distribution of gas concentration-thickness product. In FIGS. 6 and 8, the graph 1 indicates the distribution of gas concentration-thickness product along the axis x1. The graph 2 indicates the distribution of gas concentration-thickness product along the axis x2. The graph 3 indicates the distribution of gas concentration-thickness product along the axis x3. In the present embodiment, the shape of these graphs is regarded as graph shape of normal distribution. The gas concentration-thickness product decreases and the gas spreads more in the horizontal direction (axes x1, x2, and x3) as the distance from the gas leakage point P increases, which can be seen in the graphs 1, 2, and 3.

In the present embodiment, the distribution of gas concentration along the axis x is obtained on the basis of the concentration-thickness product along the axis x, and is regarded as the concentration distribution of gas along the axis z.

Figure 9:
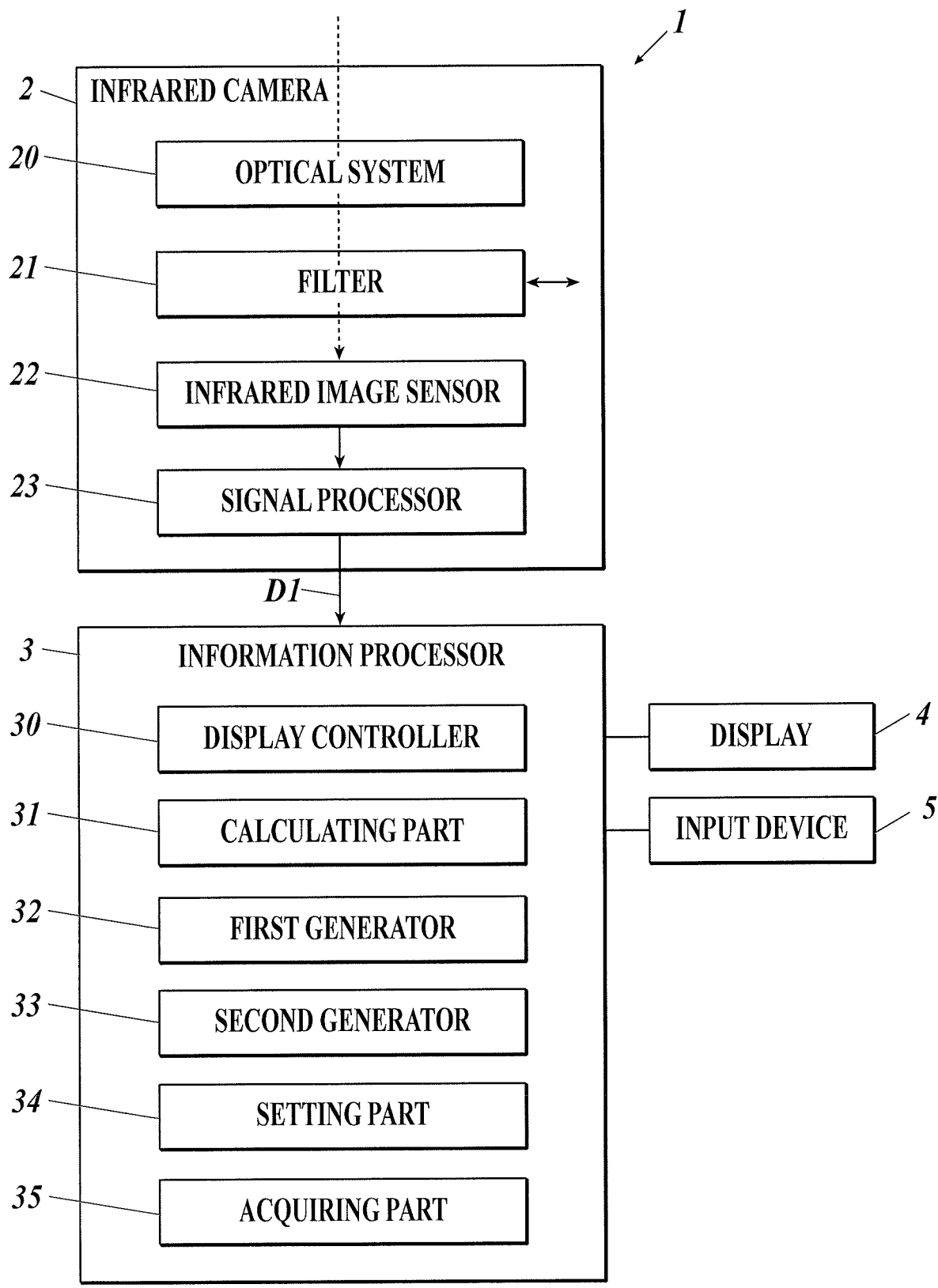
FIG. 9 shows a block diagram specifying the elements of the function of calculating the gas concentration-thickness product of the gas monitoring system in accordance with the present embodiment.

FIG. 9 is a block diagram specifying the elements of the calculation function of the distribution of gas concentration in the gas monitoring system 1.

The infrared camera 2 sets the space in which gas is floating (cf. background including gas) as an object, takes infrared images of the object, and generates the image data representing the infrared images. The infrared camera 2 includes an optical system 20, a filter 21, an infrared image sensor 22, and a signal processor 23.

The optical system 20 forms a thermal image of the space in which gas is floating on the infrared image sensor 22. The gas to be a measuring object is, for example, methane. The monitoring object of gas leakage (ex. a connecting point of gas transporting pipes) is in the space.

The filter 21 cuts an absorption line of gas to be the measuring object. The filter 21 can be switched between the state where it is removed from between the optical system 20 and the infrared image sensor 22 (first state) and the state where it is disposed between the optical system 20 and the infrared image sensor 22 (second state) by a switching mechanism (not shown in the drawings).

The infrared image sensor 22 has a structure with multiple pixel sensors arranged two dimensionally which can detect infrared rays. The infrared image sensor 22 receives light of infrared rays passing through the optical system 20 in the first state, and receives light of infrared rays passing through the optical system 20 and the filter 21 in the second state.

The signal processor 23 converts analog signals output from the infrared image sensor 22 into digital signals and performs the known image processing. The digital signals form the image data D1.

The infrared images taken by the infrared camera 2 and such are displayed on the display 4. The display 4 is, for example, realized by a liquid crystal display.

The input device 5 is realized by a keyboard or a touch panel provided on the display 4, and receives various kinds of input concerning gas measurement.

The information processor 3 includes a display controller 30, a calculating part 31, a first generator 32, a second generator 33, a setting part 34, and an acquiring part 35, as a functional block. The information processor 3 is realized by a CPU (central processing unit), a RAM (random access memory), a ROM (read only memory), and such.

The acquiring part 35 is a communication interface which communicates with the communicating part (not shown in the drawings) of the infrared camera 2. The acquiring part 35 acquires video data D1 (image data representing the infrared image in the space) sent from the communicating part of the infrared camera 2.

The display controller 30 displays on the display 4 the infrared images represented by the video data D1 acquired by the acquiring part 35. The display controller 30 and the display 4 function as an output part. The output part outputs a graph indicating the distribution of gas concentration in the depth direction in the space (third graph).

Figure 10:
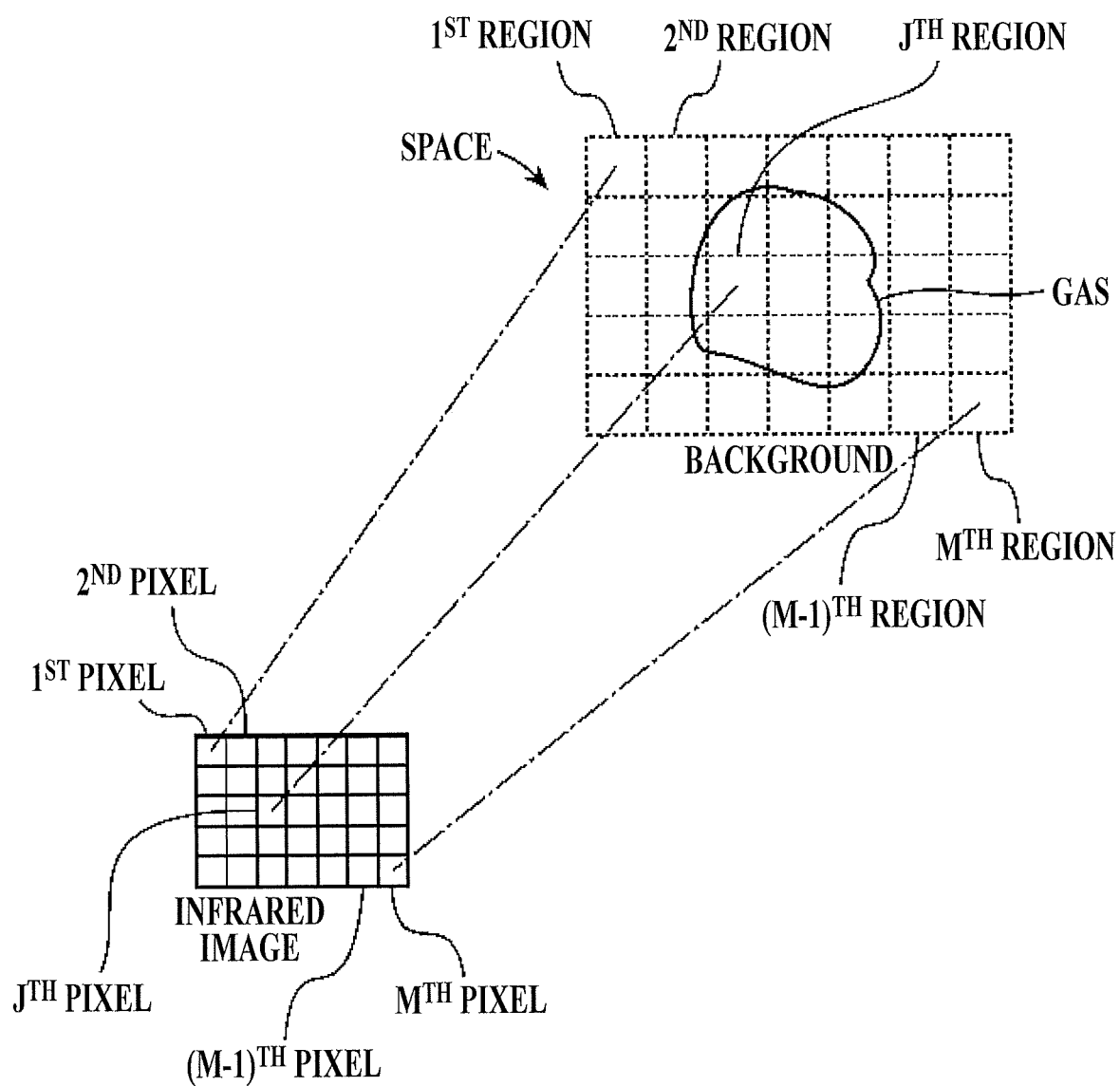
FIG. 10 shows an explanatory drawing of the relation between the infrared image taken in a state where the filter is removed from between the optical system and the infrared image sensor and the background including gas in the infrared photographing part.
Figure 11:
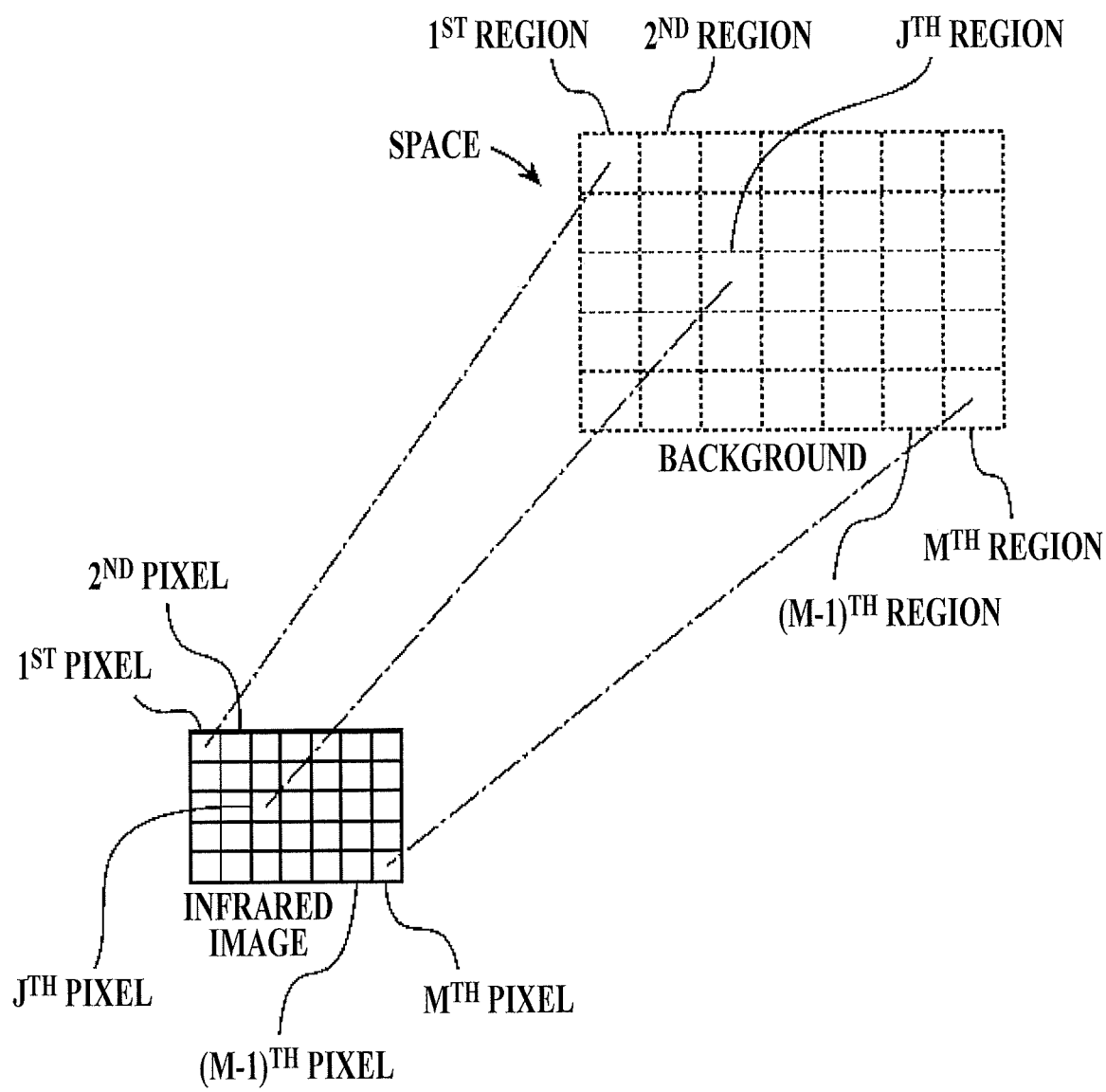
FIG. 11 shows an explanatory drawing of the relation between the infrared image taken in a state where the filter is disposed between the optical system and the infrared image sensor and the background including gas in the infrared photographing part.

The calculating part 31 calculates the concentration-thickness product of gas floating in the space. The calculation of the concentration-thickness product is now explained. FIG. 10 is an explanatory drawing of the relation between the infrared image taken in the state where the filter 21 is removed from between the optical system 20 and the infrared image sensor 22 and the background including gas in the infrared camera 2. FIG. 11 is an explanatory drawing of the relation between the infrared image taken in the state where the filter 21 is disposed between the optical system 20 and the infrared image sensor 22 and the background including gas in the infrared camera 2. Gas is leaking from the monitoring object of gas leakage and floating in the space. The infrared image is configured with the M pixels (multiple) from $1^{st}$ to $M^{th}$ arranged two-dimensionally. The infrared image is, for example, configured with 128 pixels from side to side×96 pixels from top to bottom. In that case, the number of pixels M is 128×96. The image data D1 representing the infrared image includes data of M pixels. The pixel data indicates the background temperature of the region corresponding to the pixel.

The background is virtually divided into M regions from $1^{st}$ to $M^{th}$ corresponding to each of the M pixels. For example, the $1^{st}$ pixel corresponds to the $1^{st}$ region, and the pixel data of the $1^{st}$ pixel indicates the background temperature of the $1^{st}$ region. The $J^{th}$ pixel corresponds to the $J^{th}$ region and, and the pixel data of the $J^{th}$ pixel indicates the background temperature of the $J^{th}$ region.

To calculate the concentration-thickness product of gas located in a region, the background temperature of the region in a state where gas is present in the region (background temperature with gas) and the background temperature of the region in a state where gas is not present in the region (background temperature without gas) are necessary. For example, to calculate the concentration-thickness product of gas located in the $J^{th}$ region, the background temperature with gas in the $J^{th}$ region and the background temperature without gas in the $J^{th}$ region are necessary.

In the present embodiment, first, an infrared image is taken in the state where the filter 21 is removed from between the optical system 20 and the infrared image sensor 22 (FIG. 10). Next, an infrared image is taken in the state where the filter 21 is disposed between the optical system 20 and the infrared image sensor 22 (FIG. 11). In the latter state, as the filter 21 cuts the absorption line of gas, the state where gas is not present is visualized. This can visualize the condition where gas is present in a region (ex. $J^{th}$ region) and the condition where gas is not present in the region ($J^{th}$ region).

In the present embodiment, the gas concentration-thickness products is calculated using the so-called Second Sight method. In this method, the amount of infrared rays in each of two regions where leaked gas is floating and which have different background temperatures is calculated. The two regions are any two of M regions, and hereinafter referred to as the region A and region B. In the second sight method, values of the concentration-thickness product ct are changed in the following formula, and the gas concentration-thickness product ct in the regions A and B is obtained when the both members of the following formula are proximate to each other.

$$P_B - P_A = \varepsilon \int_{\lambda_1}^{\lambda_2} \exp(-\alpha(\lambda)ct) S(\lambda) [B(T_{back\_B}, \lambda) - B(T_{back\_A}, \lambda)] d\lambda \qquad \text{[Math. 2]}$$

Here $P_A$ denotes the amount of infrared rays in the region A observed by the infrared camera 2. $B(T_{back\_A}, \lambda)$ denotes the amount of background infrared radiation in the region A ($T_{back\_A}$ is the background temperature and $\lambda$ is the wave length in the region A). $P_B$ denotes the amount of infrared rays observed by the infrared camera 2 in the region B. $B(T_{back\_B}, \lambda)$ denotes the amount of background infrared radiation in the region B ($T_{back\_B}$ is the background temperature and $\lambda$ is the wave length in the region B). $S(\lambda)$ is the optical system transmittance rate, and ct is the gas concentration-thickness product (with c representing concentration and t representing thickness). The parameters (coefficients) are denoted by each of $\varepsilon$ and $\alpha(\lambda)$. The integral $\int$ is computed in the wave length range of the infrared rays observed.

The amount of infrared rays in the region A is obtained on the basis of the pixel data of the pixel corresponding to the region A from M pixels. The amount of infrared rays in the region B is obtained on the basis of the pixel data of the pixel corresponding to the region B from M pixels. As described above, the gas concentration-thickness product in a region is obtained on the basis of the pixel value of the pixel corresponding to the region. The calculating part 31 calculates the gas concentration-thickness product corresponding to each of M regions (M pixels).

Figure 12:
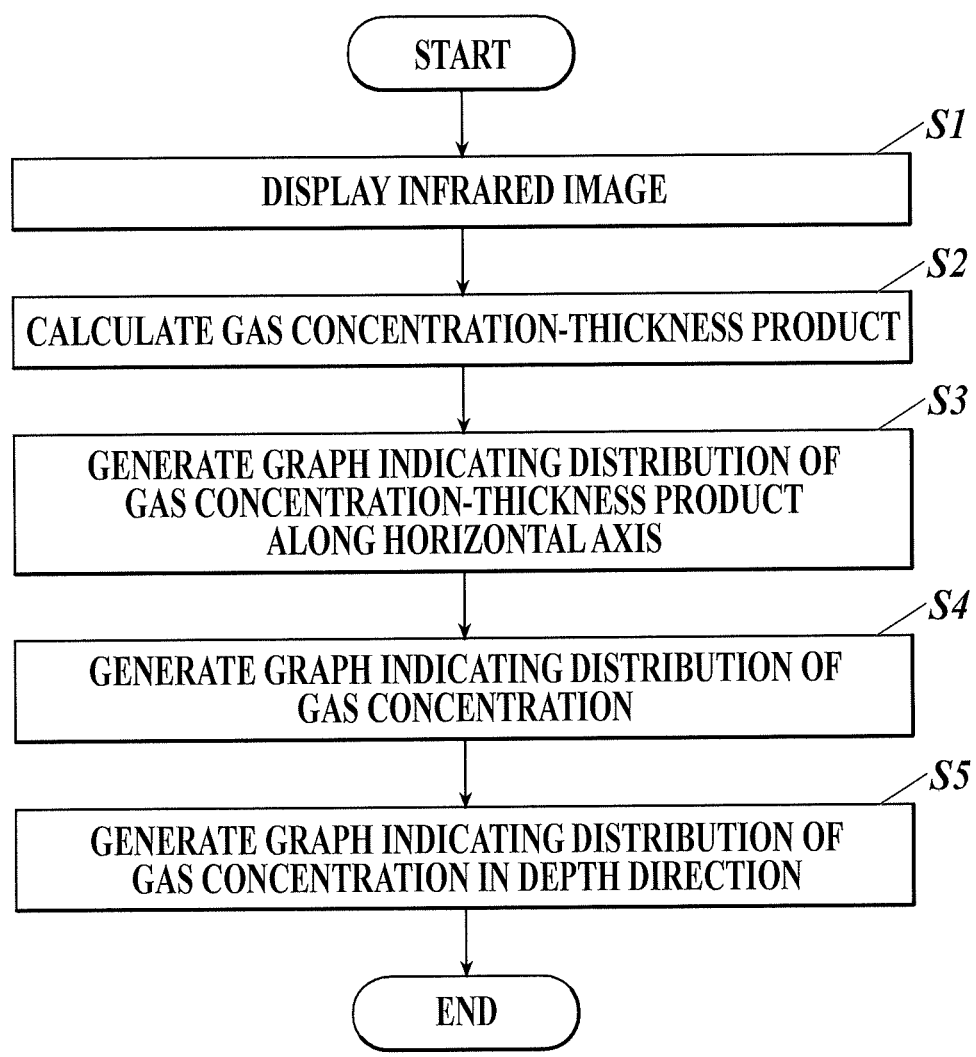
FIG. 12 shows a flowchart explaining the operation of calculating the distribution of gas concentration of the gas monitoring system in accordance with the present embodiment.
Figure 13:
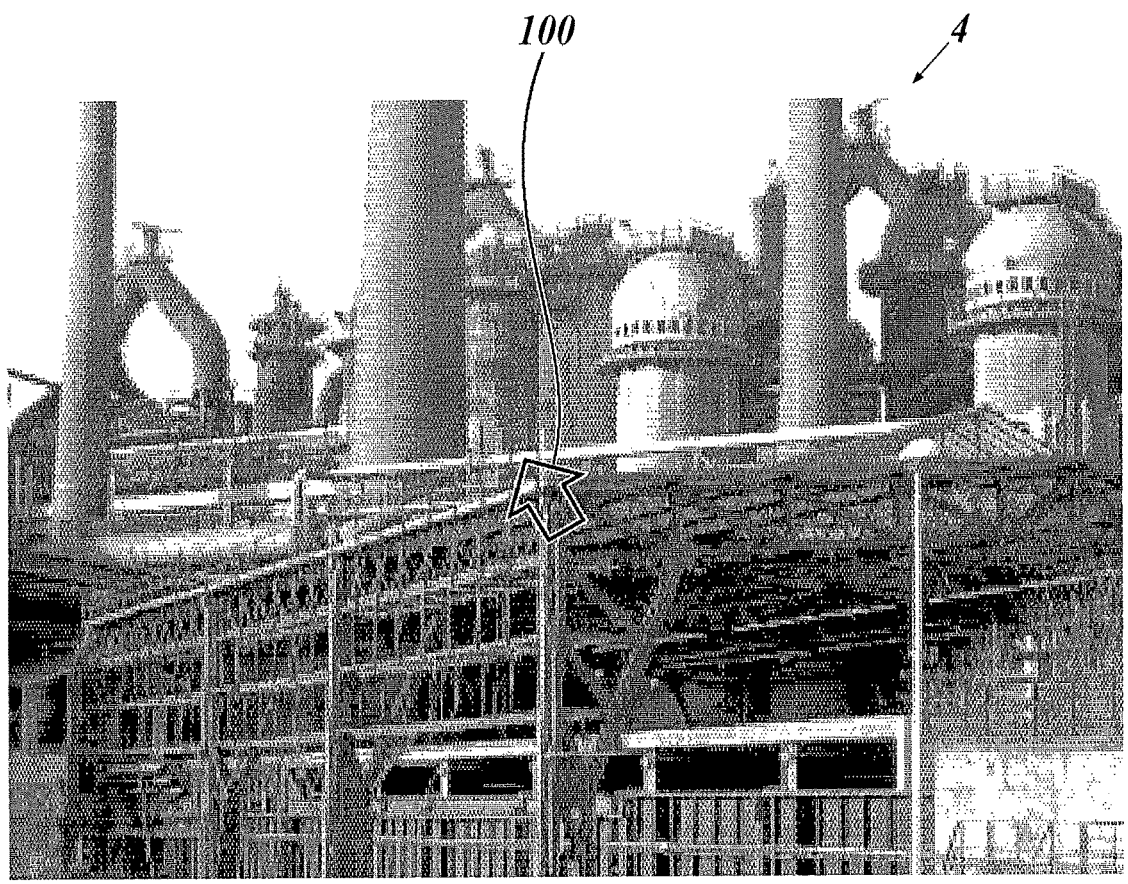
FIG. 13 shows an image drawing of the infrared image displayed on the display.

The first generator 32, the second generator 33, and the setting part 34 are explained in the calculating operation of the distribution of gas concentration in the present gas monitoring system 1. FIG. 12 is a flowchart explaining the calculating operation of the distribution of gas concentration in the present system 1 according to the present embodiment. In FIGS. 9 and 12, the display controller 30 displays the infrared image taken by the infrared camera 2 on the display 4 (Step S1). FIG. 13 is an image drawing showing the infrared image displayed on the display 4.

Figure 14:
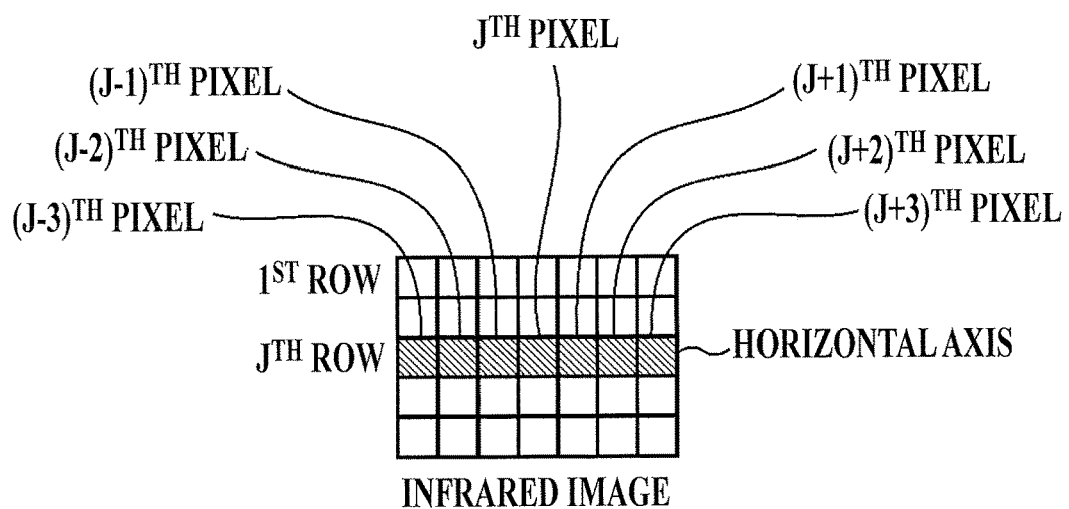
FIG. 14 shows a schematic drawing of the horizontal axis set on the infrared image displayed on the display.

The operator of the present gas monitoring system 1 operates the input device 5 and specifies the location of gas leakage point (ex. gas leakage point P shown in FIG. 6) in the infrared image displayed on the display 4, using the cursor 100. That is, in the infrared image displayed on the display 4, the location which the operator marks is set as the mark location, and the operator gives an input to specify the mark location by operating the input device 5. Alternatively, the setting part 34 specifies the gas leakage location assumed at the gas leakage location assumption step (E4) as the mark location. The setting part 34 sets a horizontal axis through the specified mark location on the infrared image. The horizontal axis represents the horizontal direction in the space where the leaking gas is floating. FIG. 14 is a schematic drawing of the horizontal axis set on the infrared image displayed on the display 4. The horizontal axis is set in the $J^{th}$ row of the infrared image. Though the number of pixels in each row is 7, for simplicity in FIG. 14, an infrared image with 128 pixels from side to side has 128 pixels in each row. The horizontal axis corresponds to an axis representing the horizontal direction in the space represented by the axes x in FIG. 6 (ex. axes x1, x2, and x3).

The calculating part 31 calculates the gas concentration-thickness product corresponding to each pixel arranged in the direction of the horizontal axis on the basis of the pixel data of each pixel included in the image data D1 representing the infrared image, out of all the pixels making up the infrared image displayed on the display 4 (Step S2). In FIG. 14, the calculating part 31 calculates the gas concentration-thickness product corresponding to each pixel arranged in the direction of the horizontal axis (($J-3)^{th}$ pixel, $(J-2)^{th}$ pixel, $(J-1)^{th}$ pixel, $J^{th}$ pixel, $(J+1)^{th}$ pixel, $(J+2)^{th}$ pixel, $(J+3)^{th}$ pixel) on the basis of the pixel data of each pixel included in the image data D1 representing the infrared image.

For a detailed explanation, the calculating part 31 calculates the gas concentration-thickness product corresponding to the $(J-3)^{th}$ pixel (gas concentration-thickness product of the $(J-3)^{th}$ region) on the basis of the pixel data of $(J-3)^{th}$ pixel, the gas concentration-thickness product corresponding to the $(J-2)^{th}$ pixel (gas concentration-thickness product of the $(J-2)^{th}$ region) on the basis of the pixel data of $(J-2)^{th}$ pixel, the gas concentration-thickness product corresponding to the $(J-1)^{th}$ pixel (gas concentration-thickness product of the $(J-1)^{th}$ region) on the basis of the pixel data of $(J-1)^{th}$ pixel, the gas concentration-thickness product corresponding to the $J^{th}$ pixel (gas concentration-thickness product of the $P^{th}$ region) on the basis of the pixel data of $J^{th}$ pixel, the gas concentration-thickness product corresponding to the $(J+1)^{th}$ pixel (gas concentration-thickness product of the $(J+1)^{th}$ region) on the basis of the pixel data of $(J+1)^{th}$ pixel, the gas concentration-thickness product corresponding to the $(J+2)^{th}$ pixel (gas concentration-thickness product of the $(J+2)^{th}$ region) on the basis of the pixel data of $(J+2)^{th}$ pixel, and the gas concentration-thickness product corresponding to the $(J+3)^{th}$ pixel (gas concentration-thickness product of the $(J+3)^{th}$ region) on the basis of the pixel data of $(J+3)^{th}$ pixel.

Figure 15:
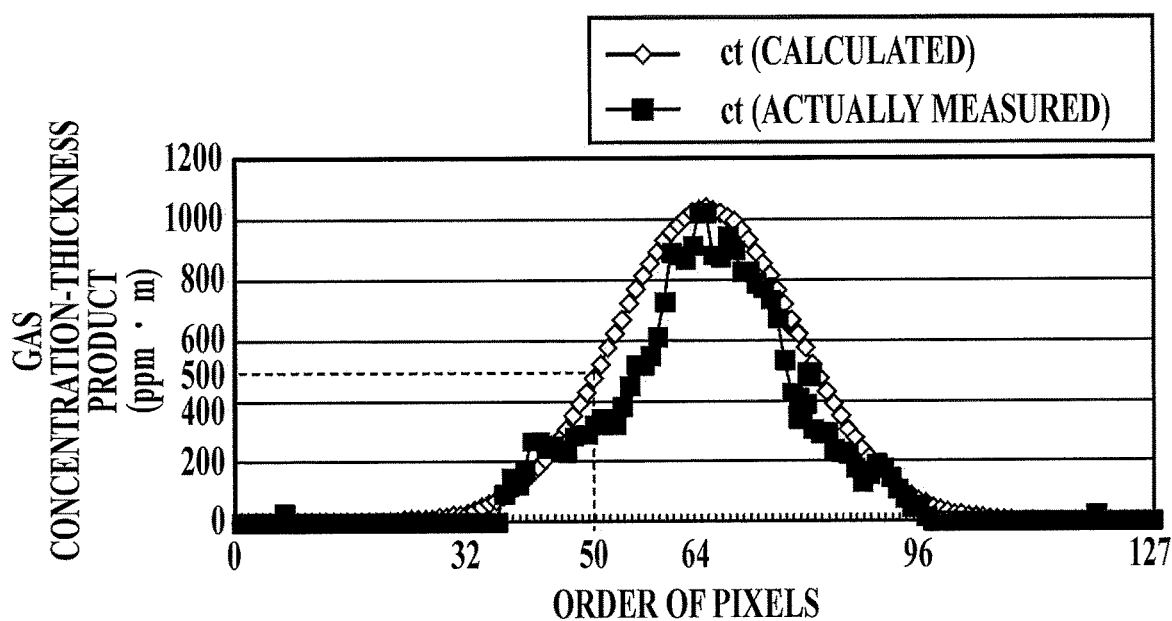
FIG. 15 shows a graph indicating the distribution of gas concentration-thickness product calculated at Step S2, and a graph obtained by Gaussian fitting of the graph.

The first generator 32 generates a graph (first graph) indicating the distribution of gas concentration-thickness product along the horizontal axis shown in FIG. 14, using the concentration-thickness product calculated at Step S2 (Step S3). FIG. 15 shows a graph indicating the distribution of gas concentration-thickness product calculated at Step S2, and a graph obtained by the Gaussian fitting of the graph. The former indicates the line representing ct (actually measured), and the latter indicates the line representing ct (calculated). The horizontal axis of the graph represents the order of pixels (order of $0^{th}$ to $127^{th}$ pixels). For example, in the $J^{th}$ row, it represents the order of the $0^{th}$ to $127^{th}$ pixels in the $J^{th}$ row. The vertical axis of the graph represents the gas concentration-thickness product.

The first generator 32 generates a graph of ct (actually measured), that is, a graph (fourth graph) indicating the distribution of gas concentration-thickness product calculated at Step S2. The first generator 32 performs the least squares fitting on the graph of ct (actually measured) to be in a normal distribution shape, generating the graph of ct (calculated) from the graph of ct (actually measured). The graph of ct (calculated) is to be the above-mentioned first graph. Though the graph of ct (calculated) is the first graph in the present embodiment, the graph of ct (actually measured) may be the first graph.

The second generator 33 sets a designated pixel where the gas concentration-thickness product is 0 as a reference pixel out of $0^{th}$ to $127^{th}$ pixels (each pixel), using the graph (first graph) generated at Step S3. Assume that, as in FIG. 15, in the graph of ct (calculated) which is the first graph, the gas concentration-thickness product corresponding to the $0^{th}$ to $32^{nd}$ pixels is 0, and the gas concentration-thickness product corresponding to the $33^{rd}$ pixel is larger than 0. The second generator 33 sets, as the reference pixel, the $32^{nd}$ pixel where the gas concentration-thickness product switches from 0 to a value larger than 0.

The second generator 33 generates a graph (second graph) indicating the distribution of gas concentration along the first axis by setting an axis representing the horizontal direction in the space and corresponding to the horizontal axis (FIG. 14) as the first axis, setting, as a conversion value, a value which is the distance from the reference pixel to each pixel ($0^{th}$ to $127^{th}$ pixels) converted into the distance in the space, and dividing the gas concentration-thickness product corresponding to each pixel ($0^{th}$ to $127^{th}$ pixels) shown in the first graph by the conversion value corresponding to each pixel ($0^{th}$ to $127^{th}$ pixels) (Step S4). The first axis is, for example, the axis x1, x2, or x3 in FIG. 6.

For a detailed explanation, assume that the order of reference pixel is $32^{nd}$, out of the pixels each arranged in the direction aligning with the horizontal axis (FIG. 14). Assume that the value which is the size of one pixel converted into the distance in the space is one meter, and that the gas concentration-thickness product corresponding to the $50^{th}$ pixel shown in the graph of ct (calculated) is 500. The gas thickness corresponding to the $50^{th}$ pixel is 500÷(50−32)×1. The second generator 33 calculates the gas thickness for each pixel.

Figure 16:
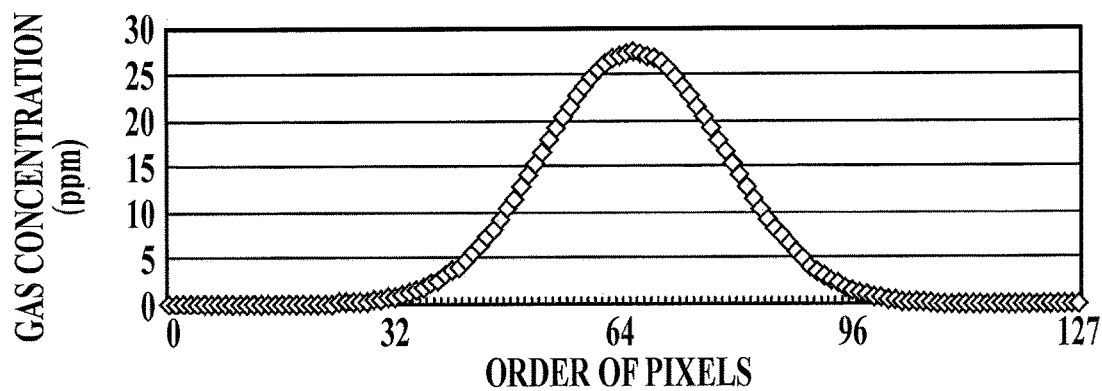
FIG. 16 shows a graph generated at Step S4.

FIG. 16 is the graph (second graph) generated at Step S4. The horizontal axis of the graph represents the order of pixels (order of $0^{th}$ to $127^{th}$ pixels). For example, in the $J^{th}$ row, it represents the order of the $0^{th}$ to $127^{th}$ pixels in the $J^{th}$ row. The vertical axis of the graph represents the gas concentration.

Figure 17:
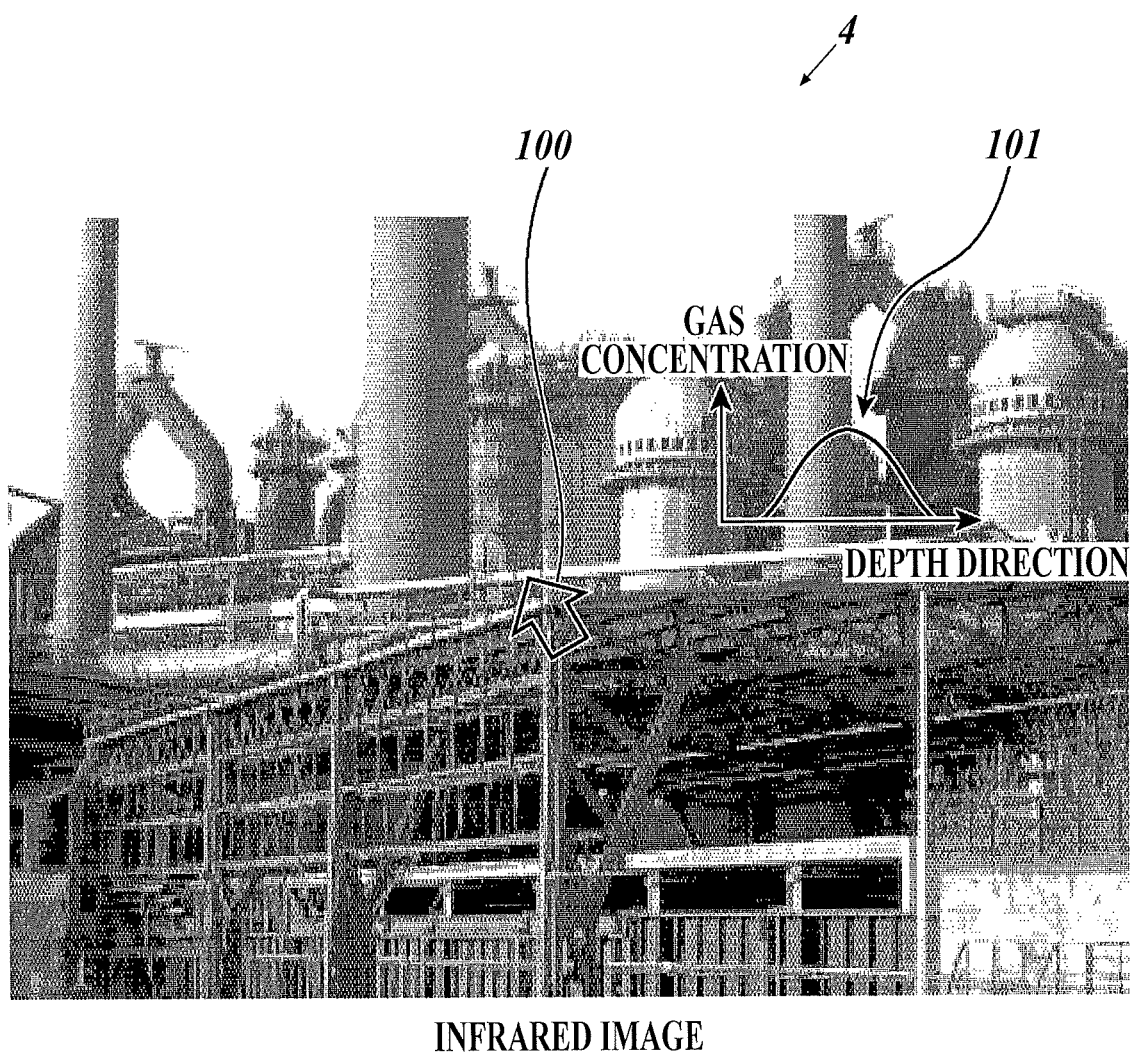
FIG. 17 shows an image drawing of an infrared image and a graph indicating the distribution of gas concentration in the depth direction in the space.

The display controller 30 displays, on the display 4, the graph generated at Step S4 (second graph) as the graph (third graph) indicating the distribution of gas concentration in the depth direction in the space (Step S5). FIG. 17 is an image drawing showing an infrared image and a graph 101 (third graph) indicating the distribution of gas concentration in the depth direction in the space. The graph 101 is superimposed on the infrared image of FIG. 13 and displayed on the display 4.

In the present embodiment, the distribution of gas concentration along the axis representing the depth direction from the position of the origin shown in FIG. 6 (ex. axes z1, z2, and z3) is obtained. The general formula to obtain this is as follows.

Gas concentration=Gas concentration-thickness product÷Distance (The distance is the distance between the location of the gas leakage point P and the mark location.)

In the present embodiment, the gas concentration is obtained on an assumption that the distribution of gas concentration in the depth direction is equal in the same plane (ex. plane PL1). That is, as for the position shifting from the origin in the horizontal direction (ex. any position on the axis x1), the gas concentration along the axis representing the depth direction from this position is obtained with the distribution of gas concentration along the axis representing the depth direction from the position of origin (origin of axis x1).

Now the main effects of the present embodiment are explained. In FIGS. 9 and 12, the first generator 32 generates a graph (first graph) indicating the distribution of gas concentration-thickness product along the horizontal axis set on the infrared image shown in FIG. 13 (Step S3). The second generator 33 generates a graph (second graph) indicating the distribution of gas concentration on the basis of the first graph (Step S4). When the axis corresponding to the horizontal axis is the first axis in the space where gas is floating, the second graph is a graph indicating the distribution of gas concentration along the first axis. For example, when the first axis is the axis x1 in FIG. 6, the second graph is the graph indicating the distribution of gas concentration along the axis x1. When the first axis is the axis x2, the second graph is the graph indicating the distribution of gas concentration along the axis x2. When the first axis is the axis x3, the second graph is the graph indicating the distribution of gas concentration along the axis x3.

The display controller 30 displays the second graph on the display 4 as a graph (third graph) indicating the distribution of gas concentration in the depth direction in the space (Step S5). When the axis perpendicular to the first axis and indicating the depth direction is set as the third axis in the space, the third graph indicates the distribution of gas concentration along the third axis. For example, when the first axis is the axis x1 in FIG. 6 and the third axis is the axis z1, the third graph is the graph indicating the distribution of gas concentration along the axis z1. When the first axis is the axis x2 and the third axis is the axis z2, the third graph is the graph indicating the distribution of gas concentration along the axis z2. When the first axis is the axis x3 and the third axis is the axis z3, the third graph is the graph indicating the distribution of gas concentration along the axis z3. As described above, according to the present gas monitoring system 1, the distribution of gas concentration in the depth direction in the space can be measured.

According to the present embodiment, as shown in FIG. 17, the display controller 30 displays, on the display 4, an infrared image taken by the infrared camera 2 and a graph (third graph) showing the distribution of gas concentration in the depth direction together. This allows the operator of the present gas monitoring system 1 to recognize the state of gas leak on the basis of the infrared image, and to recognize the distribution of gas concentration in the depth direction as well.

It is not always necessary to display the contents above for executing the above-mentioned concentration-thickness product calculation step (E3) or the leakage volume estimation step (E10).

[The Method for Estimating the Leakage Volume Per Unit of Time]

In addition to the explanations above, the method for estimating the leakage volume per unit of time for executing the above-mentioned leakage volume estimation step (E10) is explained.

1) The distribution of gas concentration in the depth direction can be measured as described above.
2) As for the gas concentration in the depth direction, the distribution of gas in a section can be assumed, as the concentration-thickness product has been obtained from the transmission image of gas.
3) The shape of gas cloud has an intermittent part. The moving speed of gas is calculated by pattern matching and tracking of the intermittent part.
4) The leakage volume of gas per unit of time is estimated from the following formula: Moving speed of gas×Gas concentration of section=Leaking speed.

[Method for Assuming the Gas Leakage Location]

Explained here is the method for assuming the gas leakage location for executing the above-mentioned gas leakage location assumption step (E4).

The function of assuming the gas leakage location in the present gas monitoring system 1 is explained.

Figure 18:
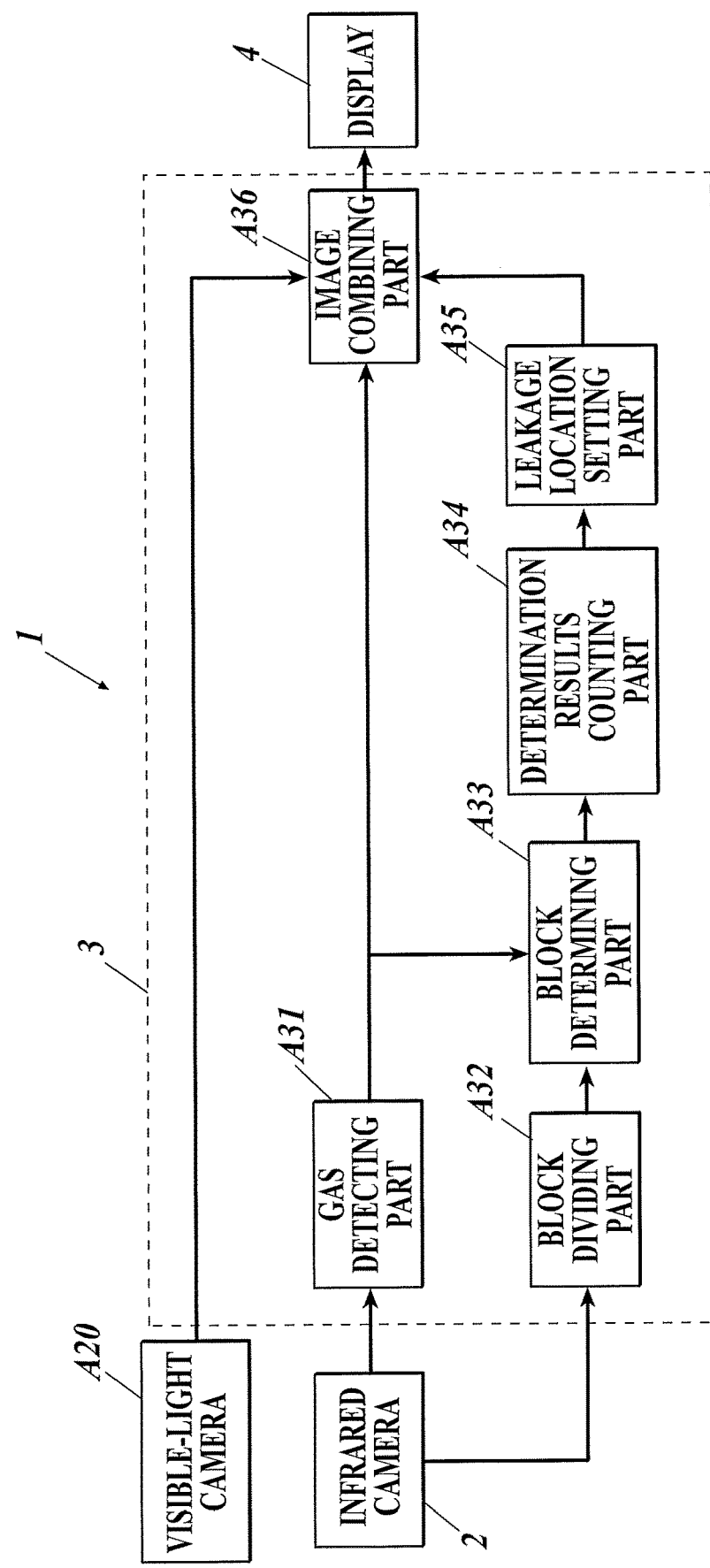
FIG. 18 shows a block diagram specifying the elements of the function of assuming the gas leakage location of the gas monitoring system in accordance with the present embodiment.

The present gas monitoring system 1, as shown in FIG. 18, includes a visible-light camera A20 besides the elements already mentioned. The information processor 30 has a gas monitoring part A31, a block dividing part A32, a block determining part A33, a counting part A34, a leakage location assuming part A35, and an image combining part A36 as the functional block.

The infrared camera 2 detects the radiant energy of infrared rays emitted from the monitoring object, and converts it into digital image signals. The visible-light camera A20 detects the visible light emitted from the monitoring object, and converts it into the digital image signals. The angle of view of the infrared camera 2 and that of the visible-light camera A20 are identical. The piping equipment of industrial plant is to be a monitoring object.

The infrared camera 2 and the visible-light camera A20 take images consecutively at a designated frame rate (ex. 30 fps), and the frame data is input successively to the information processor 30.

The gas detecting part A31 detects a gas region per pixel unit on the basis of the infrared image signals input from the infrared camera 2, using the temperature threshold value method or the moving body detection method. The temperature threshold value method is a method to determine the gas region when the detecting object is gas which has a temperature higher or lower than the temperature range of the regular environment where the monitoring object is placed when leaking, using the temperature threshold value for discriminating the temperature range of the environment. The moving body detection method is a method to determine a region of a specific pixel whose differential signal relative to another frame of reference concerning luminance signals, for example, is larger than a designated threshold value as a moving body region and to set the moving body region as the gas region. As for the other frame of reference, a frame one or a few frames ago, or a frame from the past when the whole image was being still for a while is selected.

The block dividing part A32 divides each frame image of the infrared image signals into multiple blocks at a designated size. The size of one block may be 10×10 pixels, for example.

The block determining part A33 performs the processing of block determination to determine whether the block is the gas region or not for each block of each frame, using the detection results of the gas detecting part A31. If the gas detecting part A31 detects more than the designated proportion (ex. 50%) of pixels in the block as the gas region, the block is determined as the gas region. The block determining part A33 gives a discrimination value of 1 to blocks determined as the gas region, and 0 to blocks not determined as the gas region.

The counting part A34 performs, for time-series multiple frames, the processing of count to count the number of times when each block is determined as the gas region in the processing of block determination.

The leakage location assuming part A35 performs the processing of leakage location assumption to set a block which has the count value counted by the counting part A34 exceeding a designated value as an assumed gas leakage location.

The image combining part A36 performs the processing of image combination to superimpose at a set designated transmittance rate a visualized image of infrared photographing which is made by extracting the pixels detected as the gas region by the gas detecting part A31 out of the infrared image signals input from the infrared camera 2 and converting them in the spectrum of visible light, with a back layer of a visible-light image input from the visible-light camera A20, and also to superimpose an image indicating the blocks set as the assumed gas leakage location by the leakage location assuming part A35. The combined images made by the image combining part A36 is output to be displayed on the display 4. Users can grasp the region of gas distribution and the gas leakage location, viewing the images.

The details of the above processing are explained with reference to FIGS. 19 and 20. The processing for just three frames is explained for simplification.

Assume that the gas detecting part A31 has detected the gas region G1 in the first frame F1 as shown in FIG. 19A1.

In response to this, the block determining part A33 gives a discrimination value of 1 to blocks determined as the gas region, and 0 to blocks not determined as the gas region, as shown in FIG. 19B1.

Next, assume that the gas detecting part A31 has detected the gas region G2 in the second frame F2 as shown in FIG. 19A2.

In response to this, the block determining part A33 gives a discrimination value of 1 to blocks determined as the gas region, and 0 to blocks not determined as the gas region, as shown in FIG. 19B2.

Next, assume that the gas detecting part A31 has detected the gas region G3 in the third frame F3 as shown in FIG. 19A3.

In response to this, the block determining part A33 gives a discrimination value of 1 to blocks determined as the gas region, and 0 to blocks not determined as the gas region, as shown in FIG. 19B3.

Figures 20A, 20B:
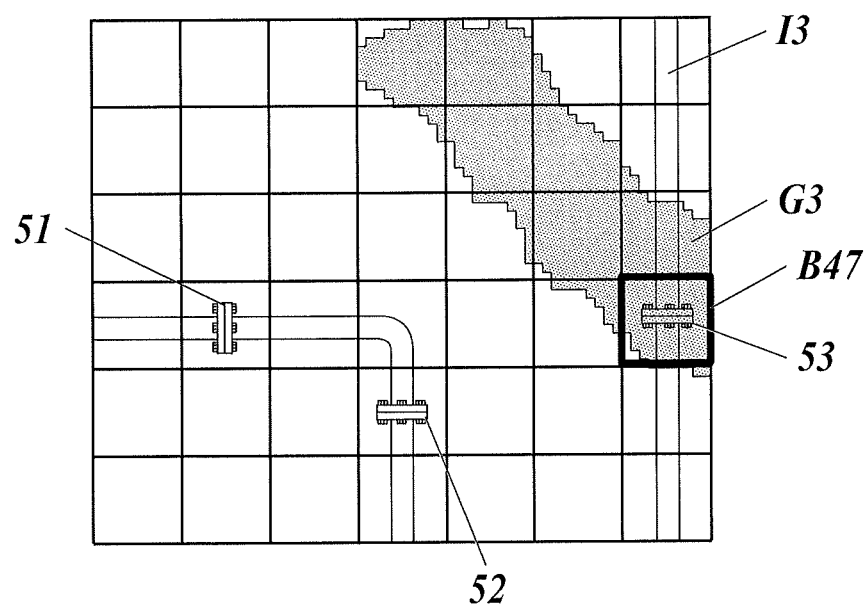
FIG. 20A shows a schematic drawing of the results of the processing of counting for image frames and the assumed gas leakage location blocks concerning the function of assuming the as leakage location of the present embodiment.
FIG. 20B shows a schematic drawing of an exemplary combined image for displaying the assumption results concerning the function of assuming the gas leakage location of the present embodiment.

The count value counted by the counting part A34 for each block through the processes above is as shown in FIG. 20A. As shown in FIG. 20A, the block B47 which has the count value exceeding the designated value is set as the assumed gas leakage location by the leakage location assuming part A35. Here the designated value is the maximum value.

As shown in FIG. 20B, the image combining part A36 performs the processing of image combination to superimpose at a set designated transmittance rate a visualized image of infrared photographing (G3) which is made by extracting the pixels detected as the gas region by the gas detecting part A31 out of the infrared image signals input from the infrared camera 2 and converting them in the spectrum of visible light, with a back layer of a visible-light image 13 input from the visible-light camera A20, and also to superimpose an image indicating the block B47 set as the assumed gas leakage location by the leakage location assuming part A35. The visible-light image and the visualized image of infrared photographing to be combined are displayed as a still image as the latest frame used in the above processing or displayed and played as a few latest frames like a movie.

It is not always necessary to display the contents above for executing the above-mentioned gas leakage location assumption step (E4).

Although embodiments of the present invention have been described and illustrated in detail, the disclosed embodiments are made forr purposes of illustration and example only and not limitation. The scope of the present invention should be interpreteded by terms of the appended claims.

INDUSTRIAL APPLICABILITY

The present invention is applicable to continuous monitoring of the gas leaking from the piping equipment and prediction of the maintenance timing of the piping equipment.

DESCRIPTION OF REFERENCE NUMERALS

1 Gas monitoring system
2 Infrared camera
3 Information processor
4 Display
5 Input device
6 Information memory

What is claimed is:

1. A non-transitory computer-readable storage medium storing a gas monitoring program which causes a computer to execute:
consecutively acquiring a continuous frame of an infrared image in which an area including piping equipment to be a monitoring object is taken;
calculating a concentration-thickness product of leaking gas in the infrared image on the basis of the infrared image acquired at the image acquiring;
calculating a gas leakage location of the leaking gas in the infrared image on the basis of the acquired infrared image and time-series multiple frames of the infrared image;

setting a gas type which circulates in a pipe proximate to the gas leakage location as a gas type of the leaking gas from the gas leakage location by referring to circulating substance information of the piping equipment and matching the gas leakage location assumed at the gas leakage location assuming;

setting a maintenance threshold value for the concentration-thickness product of the leaking gas of the set gas type;

estimating a leakage volume from the gas leakage location assumed at the gas leakage location per unit of time of the set gas type on the basis of the infrared image acquired at the image acquiring and including the time-series multiple frames; and predictively calculating a timing when the calculated concentration-thickness exceeds the maintenance threshold value on a basis of a time-changing leakage volume per unit of time estimated.

2. The non-transitory computer-readable storage medium storing the gas monitoring program according to claim 1, further causing the computer to execute:

determining whether the calculated concentration-thickness product exceeds the maintenance threshold value; and notifying that the concentration-thickness product exceeds the maintenance threshold value when it is determined that the concentration-thickness product exceeds the maintenance threshold value at the maintenance threshold value determining.

3. The non-transitory computer-readable storage medium storing the gas monitoring program according to claim 1, further causing the computer to execute;

correcting the gas type set at the gas type setting on a basis of an input signal.

4. A gas monitoring system which comprises a computer which can execute:

consecutively acquiring a continuous frame of an infrared image in which an area including piping equipment to be a monitoring object is taken;

calculating a concentration-thickness product of leaking gas in the infrared image on the basis of the acquired infrared image;

estimating a gas leakage location of the leaking gas in the infrared image on the basis of the infrared image acquired at the acquired image and time-series multiple frames of the acquired image;

setting a gas type which circulates in a pipe proximate to the gas leakage location as a gas type of the leaking gas from the gas leakage location by referring to circulating gas type information of the piping equipment and matching the estimated gas leakage location;

setting a maintenance threshold value for the concentration-thickness product of the leaking gas of the set gas type;

estimating a leakage volume from the gas leakage location assumed at the estimated gas leakage location per unit of time of the set gas type; and calculating a timing when the calculated concentration-thickness product exceeds the maintenance threshold value on a basis of a time-changing leakage volume per unit of time estimated.

5. The gas monitoring system according to claim 4, wherein the computer can further execute:

determining whether the concentration-thickness product calculated at the concentration-thickness calculating exceeds the maintenance threshold value; and notifying that the concentration-thickness product exceeds the maintenance threshold value when it is determined that the concentration-thickness product exceeds the maintenance threshold value at the maintenance threshold value determining.

6. The gas monitoring system according to claim 4, wherein the computer can further execute: correcting the gas type set at the gas type setting on a basis of an input signal.

7. A gas monitoring method using a computer to execute:

consecutively acquiring a continuous frame of an infrared image in which an area including piping equipment to be a monitoring object is taken;

calculating a concentration-thickness product of leaking gas in the infrared image on the basis of the acquired infrared image;

estimating a gas leakage location of the leaking gas in the infrared image on the basis of the acquired infrared image and time-series multiple frames of the acquired image;

setting a gas type which circulates in a pipe proximate to the gas leakage location as a gas type of the leaking gas from the gas leakage location by referring to circulating substance information of the piping equipment and matching the estimated gas leakage location;

setting a maintenance threshold value for the concentration-thickness product of the leaking gas of the set gas type;

estimating a leakage volume from the estimated gas leakage location per unit of time of the set gas type on the basis of the acquired infrared image and including the time-series multiple frames; and predictively calculating a timing when the calculated concentration-thickness product exceeds the maintenance threshold value on a basis of a time-changing leakage volume per unit of time estimated.

* * * * *